United States Patent

Inose et al.

[11] Patent Number: 6,068,359
[45] Date of Patent: *May 30, 2000

[54] PRINTER INCLUDING A FORMATTER AND A PRINTING UNIT WITHOUT A MEMORY

[75] Inventors: Shigeru Inose, Sowamachi; Fumio Miyahara, Sagamihara; Hideaki Kishida, Kawasaki; Yasuhiro Hamada, Yokohama, all of Japan

[73] Assignee: Canon Aptex Inc., Mitsukaido, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/552,115

[22] Filed: Nov. 2, 1995

[30] Foreign Application Priority Data

Nov. 7, 1994 [JP] Japan ............................ 6-272431
Nov. 7, 1994 [JP] Japan ............................ 6-272432

[51] Int. Cl.$^7$ .......................... B41J 29/38; B41B 15/00
[52] U.S. Cl. ............................................... 347/5; 395/114
[58] Field of Search ............................ 347/5, 43, 14; 395/101, 114; 358/1.5, 1.8, 1.13, 1.15

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,543,644 | 9/1985 | Kozima et al. ............................ 347/5 |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 4,760,406 | 7/1988 | Sato et al. ................................ 347/247 |
| 5,043,748 | 8/1991 | Katayama et al. . |
| 5,173,717 | 12/1992 | Kishida et al. . |
| 5,353,051 | 10/1994 | Katayama et al. . |
| 5,524,183 | 6/1996 | Kwon et al. . |
| 5,530,792 | 6/1996 | Ikeda et al. ................................ 347/5 |
| 5,532,825 | 7/1996 | Lim et al. .................................. 347/3 |

FOREIGN PATENT DOCUMENTS

| | | |
|---|---|---|
| 0 551 013 | 7/1993 | European Pat. Off. . |
| 0 551 095 | 7/1993 | European Pat. Off. . |
| 54-056847 | 5/1979 | Japan . |
| 59-123670 | 7/1984 | Japan . |
| 59-138461 | 8/1984 | Japan . |
| 60-071260 | 4/1985 | Japan . |
| 6-54121 | 2/1994 | Japan . |
| 6-183048 | 7/1994 | Japan . |

*Primary Examiner*—N. Le
*Assistant Examiner*—Thien Tran
*Attorney, Agent, or Firm*—Fitzpatrick, Cella, Harper & Scinto

[57] ABSTRACT

A printer requires no print buffer in a printer engine, and can efficiently use an image memory for bit-mapping print data into a print image. An enable signal for designating transfer of data for one page from a formatter to the engine is output in response to a request signal from the engine for requesting transmission of print data for one line. When a clock signal for requesting transfer of print data is output from the engine to the formatter in response to this enable signal, print image data is transferred from the formatter to the engine in synchronism with the clock signal and further transferred to a printhead to print an image. As to the nozzles, on the right and left ends of the printhead, which are not used for a print operation, a right margin area and a nozzle area used for a print operation are set in a data transfer circuit. With this operation, "0" is first set to a print data signal in the data transfer circuit, and reference clocks used for transferring data to the printhead are counted for the number corresponding to right margin area of the printhead. When the count operation is completed, a signal becomes active, and subsequently, print image data is transferred. When the number of reference clocks coincides with the number of nozzles corresponding to the print area, this is set to print data again. This operation is repeatedly performed for each line.

32 Claims, 23 Drawing Sheets

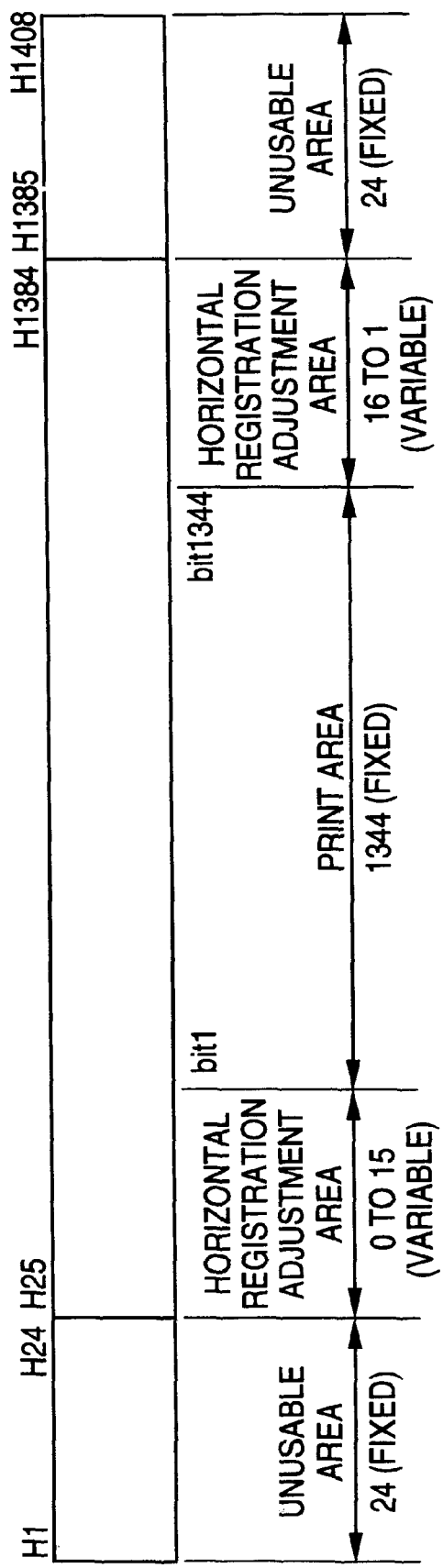

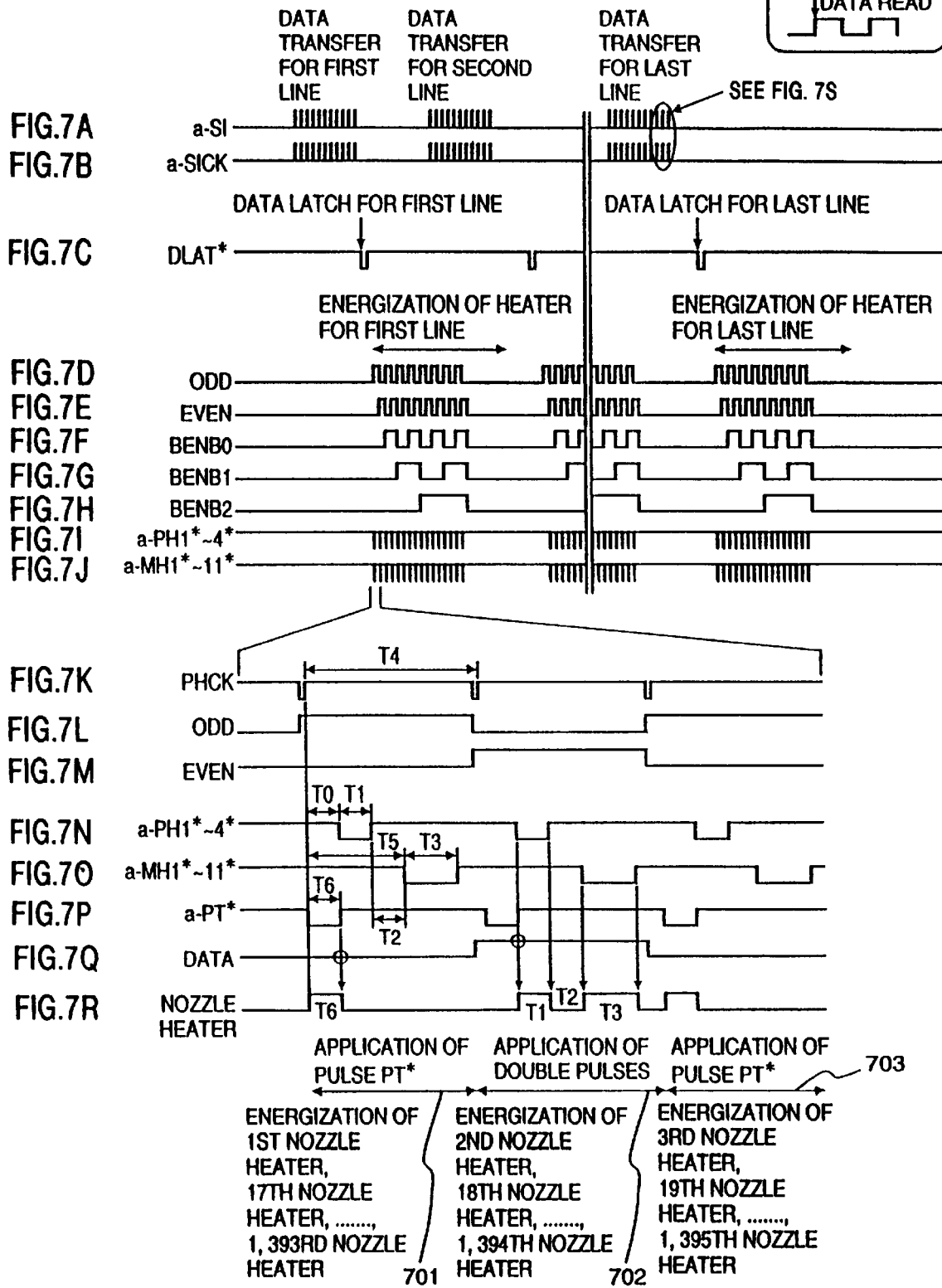

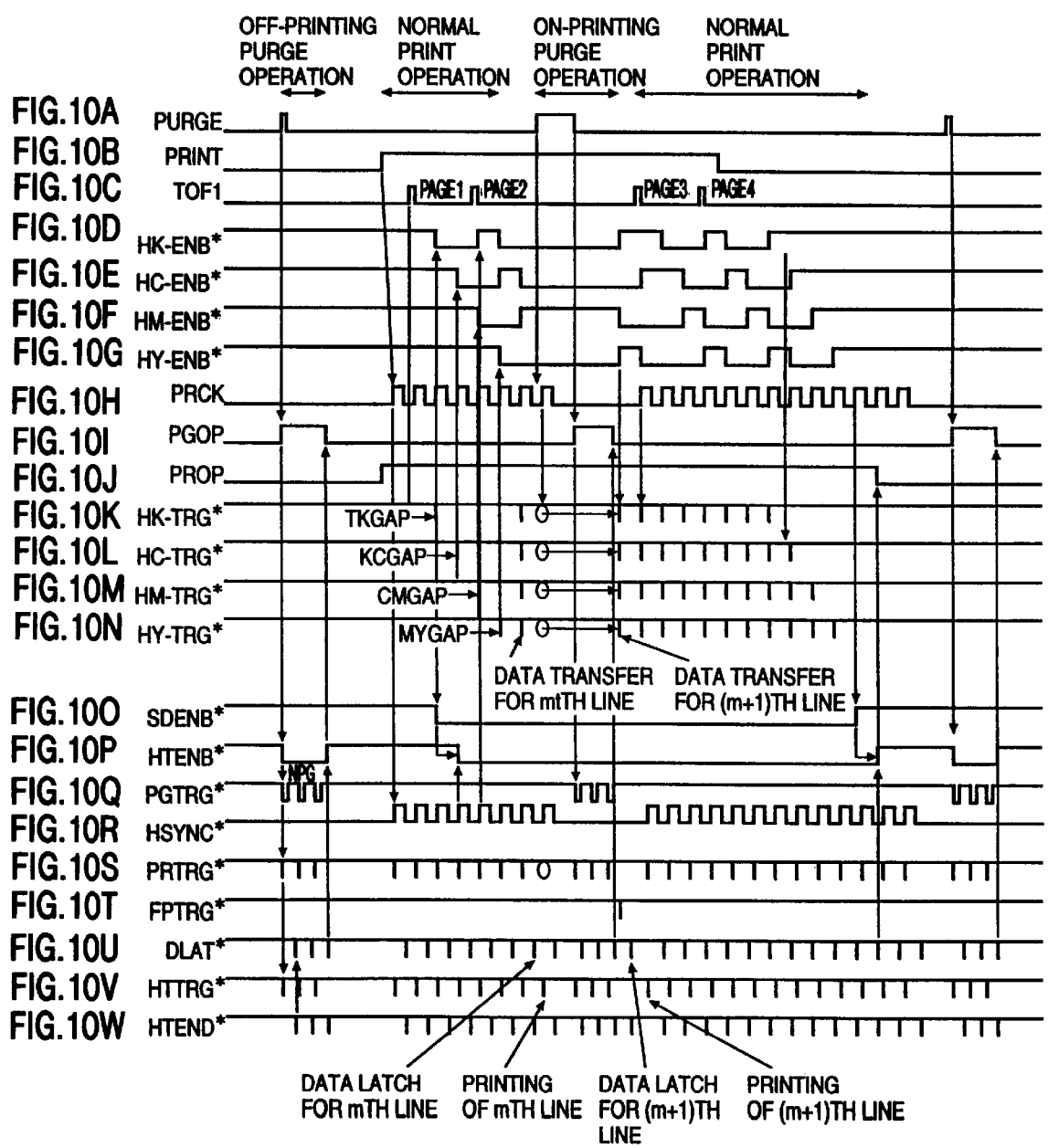

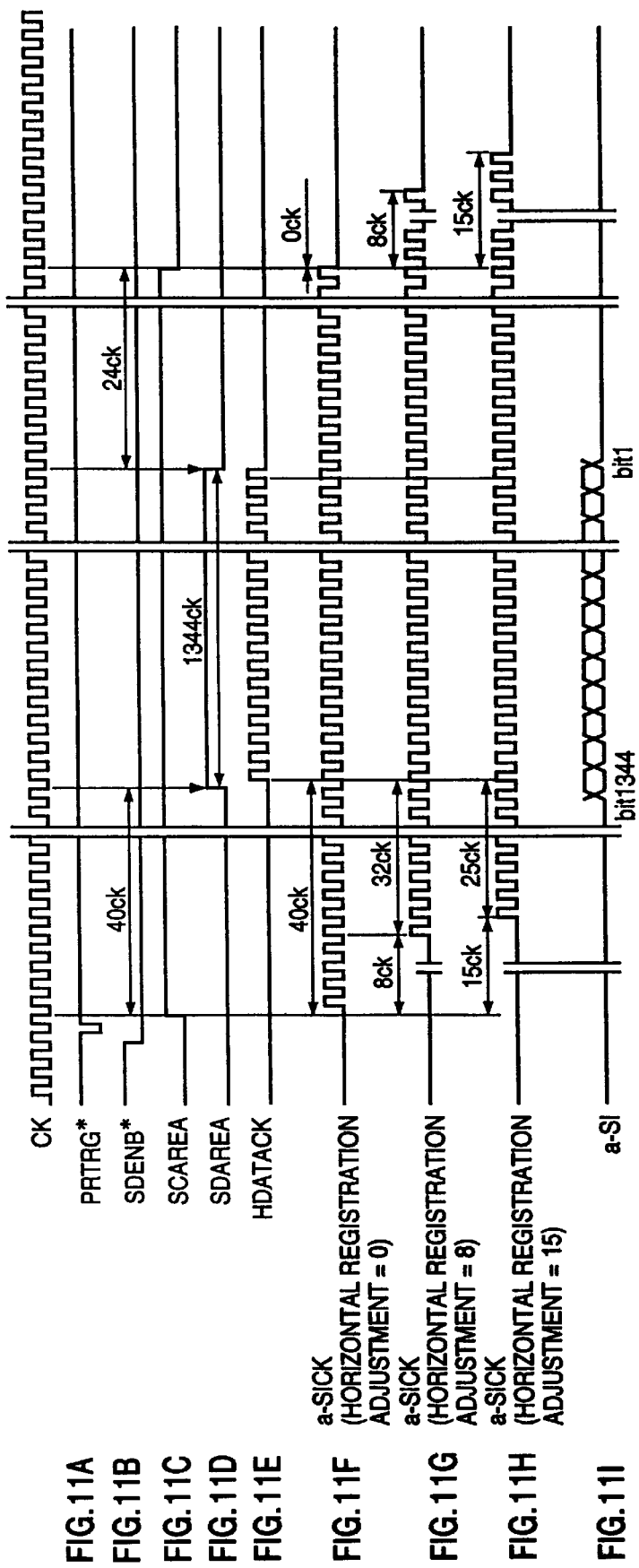

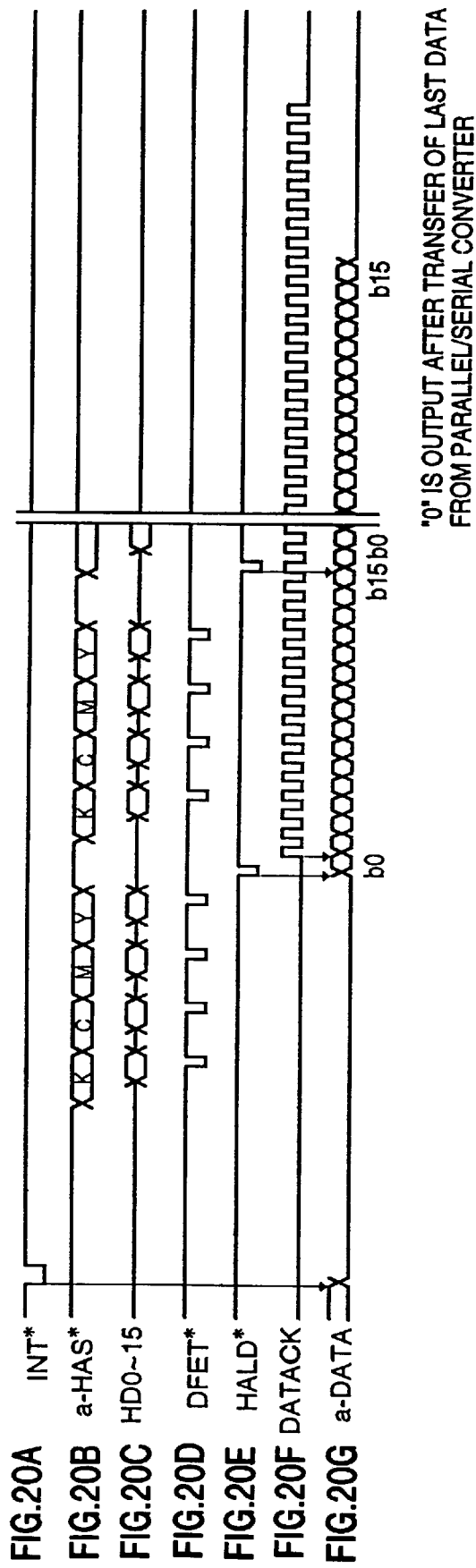

PRINTER INCLUDING A FORMATTER AND A PRINTING UNIT WITHOUT A MEMORY

BACKGROUND OF THE INVENTION

This invention relates to a printer and, more particularly, to a printer for printing an image on a recording medium by using a line-type printhead.

As a typical conventional ink-jet printer, a serial printer is available, which is designed to sequentially print images by moving the printhead. laterally with respect to a conveying direction of a printing paper. A printer (line printer) using a line-type printhead having heating elements corresponding to one line is also known. For example, typical examples of such a line printer are a thermal printer using a line-type thermal head and a thermosensitive transfer printer.

Such a printer is generally constituted by a formatter for bitmapping PDL data sent from a host computer into an image to be actually printed, a mechanical portion of the printer, and an engine for controlling the mechanical portion.

When the ink-jet printing method is applied to this line printer, the following problems are posed in terms of data transfer:

(1) If the printer is constituted by the formatter and the engine as separate units as mentioned above, print data must be transferred to the printhead while vertical and horizontal synchronizations are established in the engine. For this reason, the engine requires a print buffer memory for receiving and storing print image data from the formatter. This print buffer memory has both a function of receiving print data from the formatter and a function of adjusting the transmission timing of print data to the printhead. The printer therefore requires a control circuit or the like for controlling access to such a memory. In addition, in a color printer, for example, this memory must store data for four colors. Furthermore, since an increase in printing density is required, a large-capacity memory is required as a print buffer. Moreover, with an increase in print speed, high-speed access to the memory is required, resulting in a complicated, expensive circuit arrangement.

(2) When a color print operation is to be performed by using line-type printheads for a plurality of colors, a function (registration adjustment function) of registering the print positions of the respective heads so as to accurately align the dot positions (nozzle positions) printed by the printheads for the respective colors is required. However, since such adjustment of the nozzle positions of the respective printheads must be realized on the order of $\mu$m, it is difficult to mechanically adjust the nozzle positions.

(3) The ink-jet printer requires a cleaning operation (recovery operation) for the printheads at a predetermined timing. In the line printer, in particular, since the print data transfer operation and the print operation for the same data shift from each other by one line, if such a recovery operation is performed during a print operation, printing is performed with all the nozzles for one line. This operation, therefore, must be prevented.

The user may want to use such a line-type thermal head to print an image in an area narrower than the effective printing width of the thermal head (e.g., in a case wherein an image is to be printed on a postcard by using a line head having a width corresponding to A4-sized paper). In this case, data "0" is output to heating elements other than those in the print area.

If, for example, the bitmap memory has a data storage area corresponding to one A4-sized page, a print image is stored in a bitmap area corresponding to the postcard, while data "0" must be written in the remaining area. If, however, data which is not used for a print operation is stored in a given area of the bitmap memory in this manner, extra data bitmapping is required, resulting in a decrease in processing speed.

In addition, if heating elements which are not available for a print operation are arranged on portions near the right and left ends of the line-type printhead, data corresponding to the heating elements must be always stored as "0". In general, a memory device constituting a bitmap memory is expensive, and effective use of the memory is desirable. For this reason, it is not preferable in terms of specifications that data which is not used for a print operation be stored in the memory.

SUMMARY OF THE INVENTION

Accordingly, it is an object of the present invention to provide a printer capable of eliminating a memory (print buffer) in a print unit (engine).

It is another object of the present invention to provide a printer capable of adjusting the print (nozzle) positions among a plurality of printheads.

It is still another object of the present invention to provide a printer capable of performing a recovery operation on a printhead upon a printing operation.

According to one aspect of the present invention, the foregoing object is attained by providing a printer which includes formatter means for receiving print data from an external unit and generating print image data, and print means for receiving the print image data from the formatter means and printing the data on a recording medium, and is adapted to perform a print operation by using a line-type printhead, comprising: request signal generation means for generating a request signal for requesting transmission of print image data for one line from the print means; enable signal output means for outputting an enable signal for designating transfer of data for one page from the formatter means to the print means in response to the request signal; transfer clock output means for outputting a clock signal, from the print means for requesting transfer of print image data to the formatter means in accordance with the enable signal; first transfer means for transferring the print image data from the formatter means to the print means in synchronism with the clock signal output from the transfer clock output means; and second transfer means for transferring the print image data transferred by the first transfer means to the printhead.

In accordance with the present invention as described above, the print means requests transmission of print image data for one line, and the formatter means outputs an enable signal for designating transfer of data for one page to the print means in response to this request signal. When the print means outputs a clock signal for requesting transfer of print data to the formatter means in response to this enable signal, the print image data is transferred from the formatter means to the print means in synchronism with this clock signal. The transferred print image data is further transferred to the printhead to print an image.

It is still another object of the present invention to provide a printer capable of efficiently using an image memory for bitmapping print data into a print image.

It is still another object of the present invention to provide a printer capable of generating data corresponding to print elements which are not used for a print operation as non-print data, thereby efficiently using an image memory.

According to another aspect of the present invention, the foregoing object is attained by providing a printer for receiving print data from an external unit and printing an image on a recording medium in units of lines by using a line-type printhead, comprising: first storage means for bitmapping the print data into a print image and storing the print image; print means for receiving the print image and outputting the print image to the printhead, thereby printing the image on the recording medium; second storage means for storing position information of a print element, of print elements of the printhead, which is not used for a print operation; and transfer means for outputting print image corresponding to the position of the print element which is not used for a print operation as non-print data based on the position information stored in the second storage means when the print image stored in the first storage means is transferred to the print means.

In accordance with the above aspect of the present invention as described above, print data is bitmapped into a print image and stored in the first storage means, and the first print means receives the print image from the first storage means, outputs the print image to the printhead, and prints the image on the recording medium. Meanwhile, the positions of print elements, of the print elements of the printhead, which are not available for a print operation are stored. When the print image stored in the first storage means is to be transferred to the first print means, a print image corresponding to the positions of the print elements which are not available for a print operation are output as non-print data.

The invention is particularly advantageous since (1) no memory for storing print data is required in the printing unit; (2) the print positions among a plurality of printheads can be adjusted; and (3) a printhead recovery operation can be performed during a print operation.

According to another aspect of the present invention, the printer is advantageous in that the image memory for bitmapping print data into a print image can be efficiently used. More specifically, the image memory can be efficiently used by generating data corresponding to a portion which is not used for a print operation as non-print data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view showing the arrangement of the nozzle heaters of the printhead;

FIGS. 7A–7S are a timing chart showing a basic printing sequence in the printer in FIG. 1;

FIGS. 10A–10W comprise a timing chart showing a print operation timing set by the head control unit;

FIGS. 11A–11I comprise a timing chart showing an operation sequence in a transfer area circuit 902 and a transfer data circuit 903;

FIGS. 20A–20G comprise a timing chart for showing an operation sequence in the data transfer circuit 712 in FIG. 19.

DETAILED DESCRIPTION OF THE PREFERRED EMBODIMENTS

Figure 1:
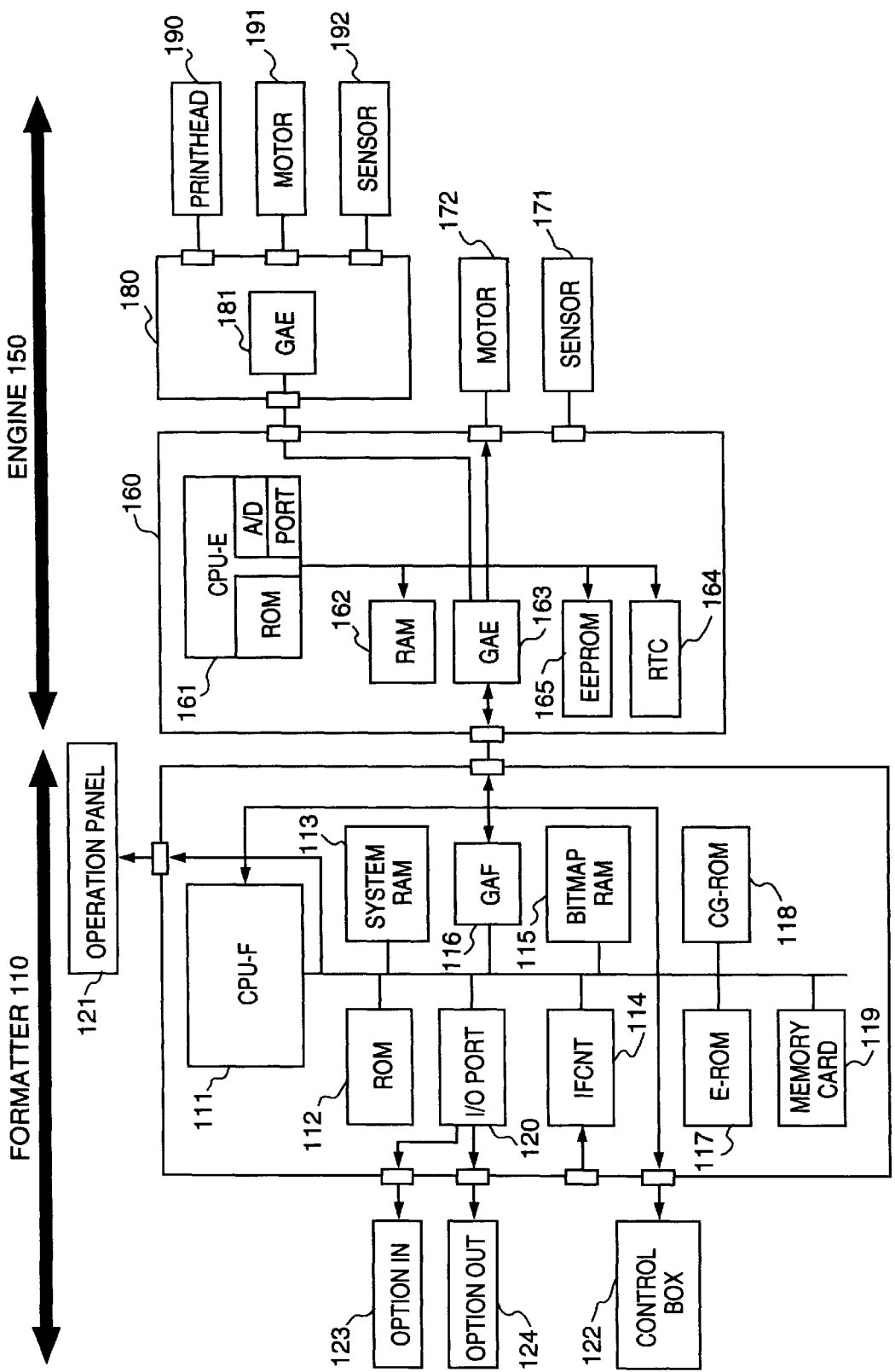
FIG. 1 is a block diagram showing the circuit arrangement of a color printer having full-line printheads based on an ink-jet method according to a typical embodiment of the present invention.

Preferred embodiments of the present invention will be described in detail below with reference to the accompanying drawings. A color printer incorporating a full-line printhead (to be referred to as printhead hereinafter) according to a typical example of the present invention will be briefly described first.

Basic Printing Sequence

Print data is transmitted to each printhead at the timing of a print operation for the preceding line. An engine detects this timing through a vertical registration adjustment counter, and transmits a trigger signal (a-TRG*; "*" indicates low true) for requesting print data to a formatter at the timing one line ahead of the print position. Upon detection of this signal, the formatter prepares for the transmission of the print data, and makes a vertical sync signal (a-ENB*), indicating the one-page data is being transferred, active. The engine transmits a print data reference clock signal (DATACK) to the formatter with a predetermined delay time with respect to the print data request signal. The formatter transmits the print data to the engine in synchronism with this reference clock signal. The engine directly transmits the received print data to the printhead.

The above operation is independently performed for each color signal except for the transmission of the reference clock signal to the formatter. The print data is therefore directly transferred from the formatter to the printhead. Consequently, the print data need not be temporarily stored in the engine.

With this operation, the transfer of the one-line print data is completed. When the one-line print data is transferred to the printhead, the engine makes a latch signal (DLAT*)

active, and temporarily stores the data in the printhead. When printing paper is then conveyed and moved by one line, an ink corresponding to the print data for the first line is discharged to perform printing. Meanwhile, a print data request signal for the second line is output from the engine to the formatter, and the same print operation as that for the first line is performed.

Subsequently, the same print operation is repeated for the third and fourth lines. While the above vertical sync signal is active, a print data request signal is transmitted to the formatter for each line in accordance with the moving amount of printing paper. In this manner, the transfer of one-page print data is completed.

Horizontal Registration Adjustment

After a print data request signal becomes active, the engine uses a clock for transferring data to the printhead as a reference clock, and counts the sum total of unused nozzle heaters of the printhead and nozzles to be subjected to horizontal registration adjustment with reference clocks. After this count operation, the engine transfers reference clocks (DATACK) corresponding to the number of the print nozzle heaters to the formatter. Upon outputting the print data request signal, the engine counts reference clocks (CK) for horizontal registration adjustment for each color signal. After the count operation, the engine transfers reference clocks (a-SICK) corresponding to the total number of the nozzle heaters to the printhead. The formatter transfers print data (a-DATA) for each color in synchronism with the reference clocks (DATACK) transferred from the engine. The print data transferred to the engine in this manner is sent to the printhead through the engine.

With this operation, after the reference clocks for horizontal registration adjustment are input to the printhead for each color, the print data synchronized with the reference clocks is input to the printhead together with the reference clocks. Thereafter, clocks for horizontal registration adjustment are input to the printhead again, thereby allowing horizontal registration adjustment.

Purge Operation during Printing

In a line printer, while a given line is printed, data for the next line is sent to a printhead. In cleaning the printhead, therefore, the engine stops outputting the print data request signal one line before a head cleaning operation during printing. After the printhead cleaning operation is completed, the engine outputs the print data request signal. The data set when the purge operation is performed during printing is rewritten, and the print data set before the purge operation is stored in the printhead after the purge operation. With this operation, even if the printing paper moves and a data transfer request signal is output, printing can be properly performed.

First Embodiment

FIG. 1 is a block diagram showing the circuit arrangement of a color printer (to be referred to as a printer hereinafter) having full-line printheads based on the ink-jet printing method according to a first embodiment of the present invention. As shown in FIG. 1, the circuit of this printer is constituted by a formatter 110 for controlling communication with a host computer (to be referred to as a host hereinafter) and bitmapping data into a bitmap RAM, and an engine 150 for performing various control operations for the printheads and controlling a convey motor and various sensors.

This arrangement is designed for the following purpose. The formatter 110 requires a circuit arrangement corresponding to various applications (e.g., a facsimile apparatus and a copying machine as well as a printer) in consideration of different interfaces with the host and different image processing methods. In contrast to this, the engine 150 is designed to reduce differences dependent on applications, and is standardized to cope with any applications, thereby attaining a reduction in cost.

In this embodiment, the following functions are assigned to the formatter 110 and the engine 150.

(1) Functions of Formatter
  interfacing with the host
  analyzing a command sent from the host
  bitmapping print data into the bitmap RAM on the basis of the command
  control of an operation panel
  control of a control box (to be described later)
  interfacing with the engine 150
  option control: control (option IN) of a printing paper supply unit, and control (operation OUT) of printing paper discharge unit (2) Functions of Engine
  interfacing with the formatter 110
  control of an ink supply subsystem
  control of a paper convey subsystem
  data transfer control for each printhead
  heater on/off control of each printhead
  temperature management
  timepiece function
  backup memory function
  printing paper width detection function In order to realize these functions, the following circuit arrangement is required.

Referring to FIG. 1, the formatter 110 is constituted by a CPU-F 111 for executing control programs, a ROM 112 for storing the control programs, a system RAM 113 for executing programs, an IFCNT 114 for communication with the host, a bit map RAM 115 for storing the bitmap data of print contents transmitted from the host, a circuit GAF 116 dedicated for controlling the bit map RAM 115 and performing communication with the engine 150, an emulation ROM (E-ROM) 117 for analyzing print data from the host, a character generator (CG-ROM) 118 for converting character code data into bitmap data, a memory card 119 used as an external memory, an I/O port 120 serving as an interface with the above option control functions, and an operation panel 121 serving as a user interface and including keys for various operations, an LCD for displaying a message from the printer, and the like.

Reference numeral 122 denotes a control box which serves as a user interface to perform various instruction input operations when this printer performs an image print operation by using image data stored in the memory card 119 in a stand-alone manner without being connected to the host; and 123 and 124, input/output interfaces (an option IN and an option OUT) with various apparatuses to be connected, as options, to the printer. In this embodiment, the printing paper supply unit (to be described later) is connected to the option IN 123, and the printing paper discharge unit (to be described later) is connected to the option OUT 124.

The engine 150 will be described next.

As shown in FIG. 1, the engine 150 is constituted by an engine circuit 160 mainly designed for a printing paper conveying operation, and an engine circuit 180 mainly designed for printhead driving control.

The engine 150 is constituted by a CPU-E 161 including a ROM for storing control programs, a RAM used as a work area to execute the programs, a port for receiving a signal from a sensor (to be described later), and an A/D converter for converting an analog input from the port into digital data, and adapted to execute the control programs to perform various control operations, a RAM 162 used when the CPU-E 161 executes a program, an EEPROM 163 for storing unevenness correction data for each printhead, a clock counter (RTC) 164, and a GAE 165 dedicated for generating test print data and performing communication with the formatter 110. Reference numeral 171 denotes a sensor for detecting the position of printing paper; and 172, a convey motor for conveying the printing paper.

The engine circuit 180 includes a circuit GAE 181 dedicated for driving/controlling a printhead 190, controlling a motor 191 for moving the printhead 190 and a cap (not shown) to cap the ink discharge nozzles of the printhead 190 when no print operation is performed, and controlling a sensor 192 for detecting the positions of the cap and the printhead.

Figure 2:
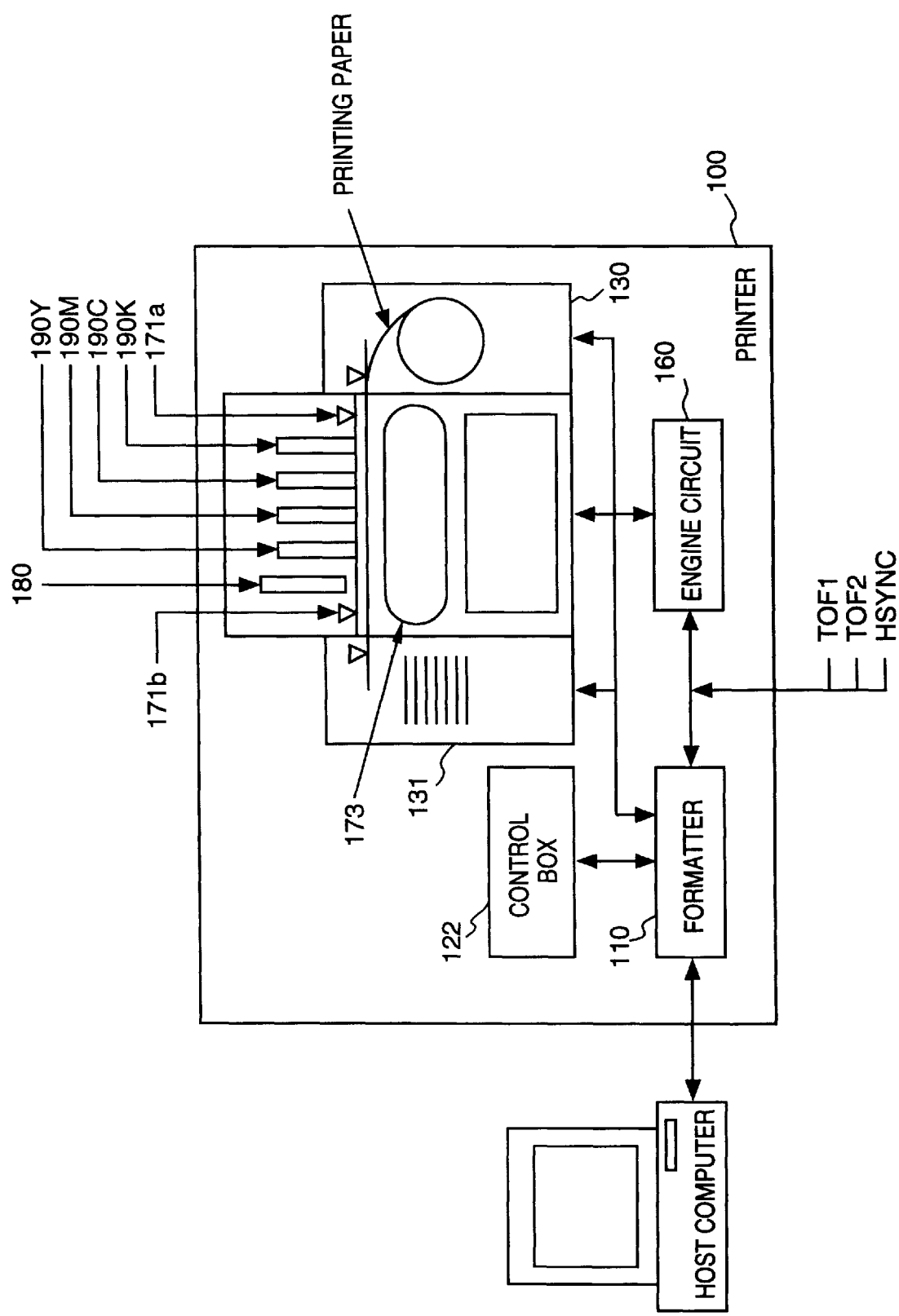
FIG. 2 is a sectional side view showing the schematic arrangement of the printer in FIG. 1.

FIG. 2 is a sectional side view showing the schematic arrangement of a printer 100 described above with reference to FIG. 1. FIG. 2 shows the printer 100 incorporating the control box 122, a printing paper supply unit 130 using roll paper as printing paper, and a printing paper discharge unit 131 having a cutter for cutting the roll paper after a print operation. The engine 150 is divided into these two parts 160 and 180 for easy implementation upon mounting on the printer, as shown in FIG. 2.

Reference numeral 190Y denotes a full-line printhead (Y head) for performing printing by using yellow (Y) ink; 190M, a full-line printhead (M head) for performing printing by using magenta (M) ink; 190C, a full-line printhead (C head) for performing printing by using cyan (C) ink; and 190K, a full-line printhead (K head) for performing printing by using black (K) ink. These printheads are arranged along the convey direction of printing paper.

Reference numeral 171a denotes a sensor for detecting the leading portion of the printing paper from black lines printed on the roll paper at predetermined equal intervals and generating a signal (TOF1); 171b, a sensor for detecting the leading portion of the printing paper from a black line printed on the roll paper after a print operation, and generating another signal (TOF2); and 173, a convey belt which is rotated/driven upon rotation of the convey motor 172. When the convey belt 173 is moved, the printing paper (recording medium) placed on the convey belt 173 is conveyed.

Figure 3:
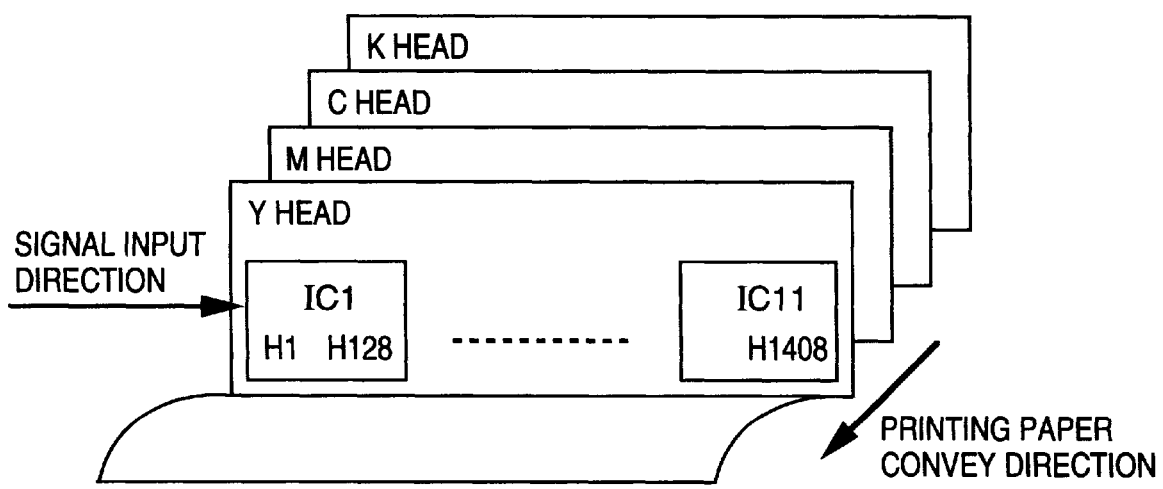
FIG. 3 is a view for explaining the printhead arrangement of the printer in FIG. 1.

FIG. 3 shows the printhead arrangement of the print unit of the printer of this embodiment.

The printhead 190 of this embodiment is constituted by four line heads, i.e., the K head for discharging black ink, the C head for discharging cyan ink, the M head for discharging a magenta ink, and the Y head for discharging yellow ink.

As shown in FIGS. 2 and 3, the printing paper is conveyed from the K head (190K) side and sequentially passes below the C head (190C), the M head (190M), and the Y head (190Y). When the printing paper passes below these heads, print data corresponding to the head portions of the respective colors are transferred to the heads, and the nozzle heaters in the heads are energized in accordance with the print data. With this operation, the inks are discharged from the corresponding nozzles to execute a print operation.

Figure 4:
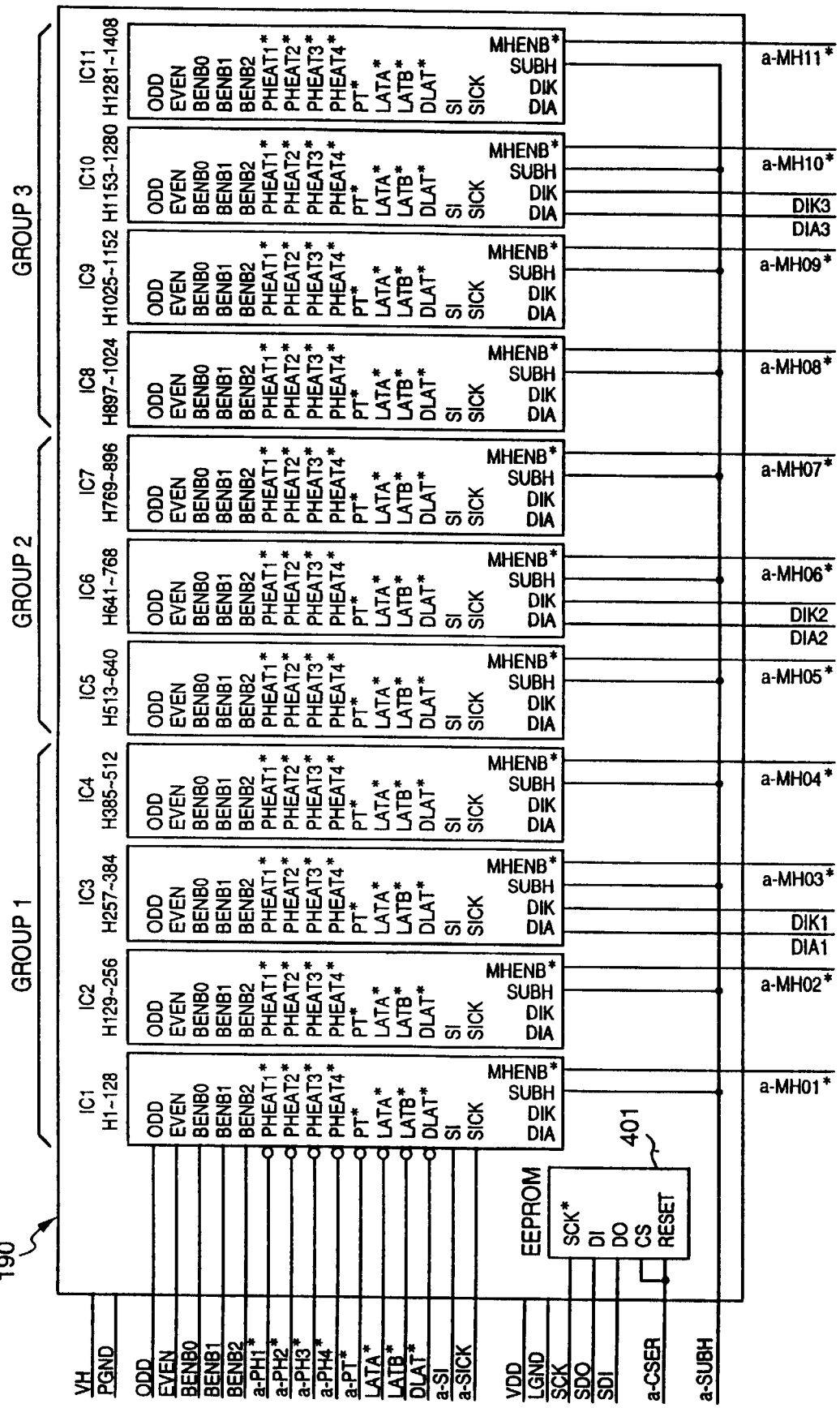
FIG. 4 is a view showing the arrangement of a printhead corresponding to one color.

FIG. 4 shows the arrangement of a printhead of the printer of this embodiment. As shown in FIG. 3 as well, each printhead includes ICs 1 to 11 each having 128 nozzles.

Figure 5:
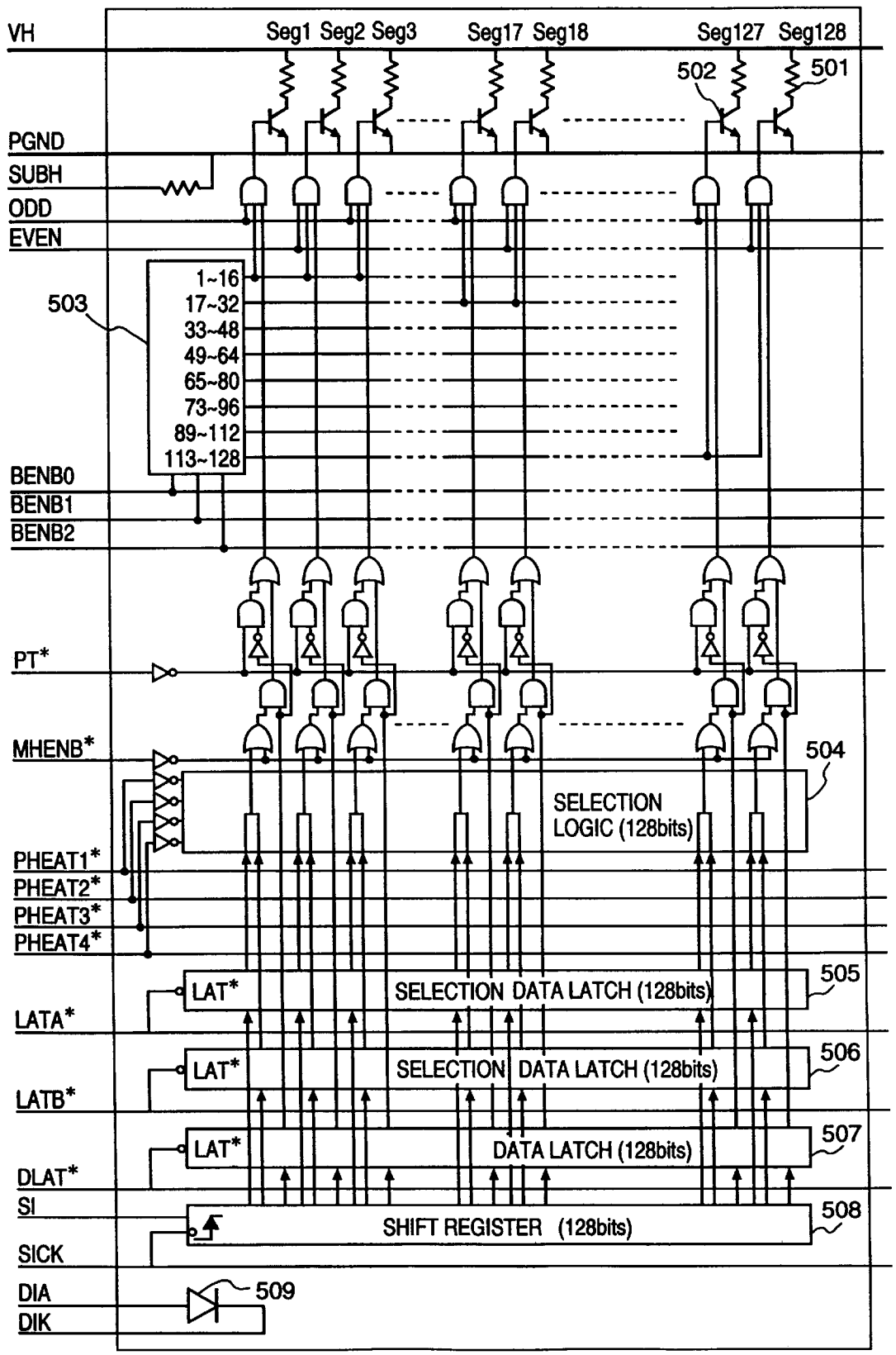
FIG. 5 is a circuit diagram showing the arrangement of a head IC of the printhead.

FIG. 5 shows the arrangement of an IC (head substrate) of a printhead of this embodiment. The ICs 1 to 11 have the same arrangement. In the following description, "*" indicates a low true signal which is true at low level.

Referring to FIG. 5, reference symbol VH denotes a power supply voltage applied to a heater 501; and PGND, GND (ground) of a heater power supply. Reference numeral 502 denotes a transistor for driving the heater 501. Reference symbol ODD denotes a signal for designating sending electricity to the odd-numbered heaters 501; and EVEN, a signal for designating sending an electricity to the even-numbered heaters 501. Reference numeral 503 denotes a 3 to 8 decoder. In this embodiment, the 128 heaters 501 are grouped into eight blocks (16 nozzles per block), and the 3 to 8 decoder 503 selects a block of heaters 501 to be driven in accordance with a block selection signal (BENB0 to BENB2). Reference symbol SUBH denotes a sub-heat signal; PT*, a signal for heating nozzles when no print operation is performed; MHENB*, a heat pulse signal for sending electricity to nozzles when a print operation is actually performed; and PHEAT1* to PHEAT4*, pre-heat pulses, which are selected by a selection logic 504 in accordance with selection data set in selection data latches 505 and 506 (to be described later). The heaters 501 are pre-heated by the selected pulse signals.

In this case, the signal PT* is a signal for adjusting the internal temperature of a printhead. This signal is used to apply pulses to the printhead so as to raise its temperature when the operating or environmental temperature of the printhead is low and no print operation is performed. The signals PHEAT1* to PHEAT4* are used as pre-heat pulses when double pulse print control is performed during a normal print operation.

Reference numeral 508 denotes a shift register for receiving selection data for selecting the pre-heat pulses (PHEAT1* to PHEAT4*) as serial data (SI) in synchronism with a clock (SICK) and holding 128-bit data. The print data held in this manner is latched by a data latch 507 in response to a signal DLAT*. The selection data is latched by the selection data latch 505 in response to a signal LATA*, and is also latched by the selection data latch 506 in response to a latch signal LATB*. Reference symbol DIA denotes an input signal to a sensor 509; and DIK, an output signal from the sensor 509.

FIG. 6 shows the heater arrangement of the printhead of this embodiment.

The total number of nozzles of the printhead of this embodiment is 128×11=1,408. In the manufacturing process for a printhead, unusable areas may be formed on the right and left portions of the printhead. For this reason, if, for example, these areas respectively include 24 nozzles near each of the right and left end portions of the printhead, a total of 1,360 nozzles are usable nozzles, which correspond to the number obtained by subtracting "48" from the total number of nozzles.

As described above, the color printer of this embodiment includes the four heads corresponding to the four colors, i.e., K, C, M, and Y, and the nozzle positions (the positions of dots to be printed) of the heads of the respective colors must be accurately aligned to be superposed. If this positioning is not accurate, proper color representation cannot be attained, and a high-image quality color print operation cannot be performed. Since such a positioning operation is very minute adjustment (on the micron ($\mu$m) order), this operation cannot be mechanically performed. For this reason, horizontal registration adjustment nozzles for positioning the printheads of the respective colors are used. The print positions of the printheads of the respective colors are adjusted depending on how many of the adjustment nozzles are used for a print operation. If the number of nozzles for horizontal registration adjustment is 16, the number of nozzles which can be used for a print operation is 1,344.

FIGS. 7A–7S comprise a timing chart showing a print sequence in the printer of this embodiment. Note that "a" of a signal name "a-xxx" in FIG. 7 indicates color signals of K, C, M, and Y, and the respective colors correspond to these signal lines. In the following description, similar signal names will be used.

Print data is sent, as a signal SI, to the printhead in synchronism with a SICK (serial clock) signal, and is stored in the shift register 508. When the signal DLAT* is made active after the data is transferred by one line, the data is temporarily stored in the data latches 507 in the ICs 1 to 11. Thereafter, heater blocks to be heated are sequentially selected in accordance with the signal ODD (odd-numbered nozzle selection signal), the signal EVEN (even-numbered nozzle selection signal), the signal BENB0 (block 0 selection signal), the signal BENB1 (block 1 selection signal), and the signal BENB2 (block 2 selection signal). Signals a-PH1* to a-PH4* and a-MH1* to a-MH11 are then made active to send electricity to the heaters 501 of the respective ICs. With this operation, an ink is discharged from the corresponding nozzles to perform a print operation.

Note that print data for the next line is transferred while the heaters for the currently printed line are energized. The signal DLAT* for the next line must be made active after the lapse of one of the heat time of the heaters for the currently printed line or the data transfer time, whichever is longer. This is because, if the signal DLAT* for the next line is made active in the heat time of the heaters for the currently printed line, print data set after the signal DLAT is made active becomes print data for the next line.

In general, the print speed is determined mainly by the basic performance of a printhead. In this case, since the heat time of the heaters is longer than the data transfer time, the signal DLAT* becomes active in a print operation after a normal heater energizing operation.

Referring to FIG. 7, reference numeral 701 denotes the energization timing of the 1st heater, the 17th heater, the 33rd heater, . . . , the 1,393rd heater. At the timing 701, since data (DATA) is "0", only the heat pulses based on a signal a-PT* are applied. Reference numeral 702 denotes the heat timing of the 2nd heater, the 18th heater, the 34th heater, . . . , the 1,394th heater. At the timing 702, since data is "1", main heat pulses of a width T3 are applied after a pre-heat period of a width T1 and a quiescent period of a width T2. Reference numeral 703 denotes the heat timing of the 3rd heater, the 19th heater, the 35th heater, . . . , the 1,395 heater. Similar to the timing 701, at the timing 703, since data is "0", only the heat pulses based on the signal a-PT* are applied.

As shown in FIG. 4, the printhead incorporates an EEPROM 401 for storing information about the nozzles. For example, the contents stored in the EEPROM 401 include pre-pulse data, pre-pulse selection data, temperature adjustment pulse data, head rank data, and other ID data.

Description of Engine Circuit 180 and Gate Array (GAE) 181

Figure 8A:
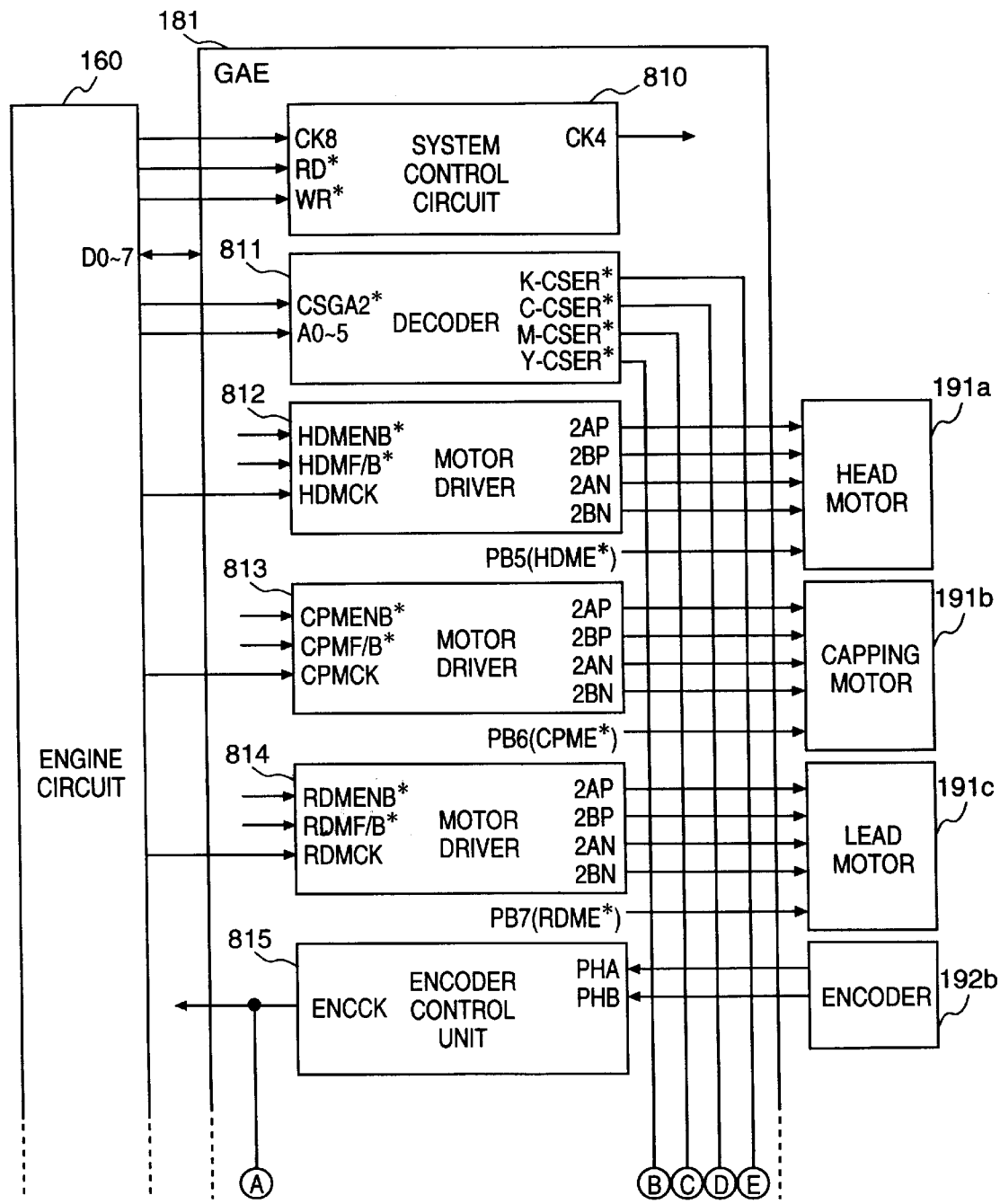
FIGS. 8A and 8B are block diagrams showing the arrangements of a GAE 181 in an engine circuit 180.
Figure 8B:
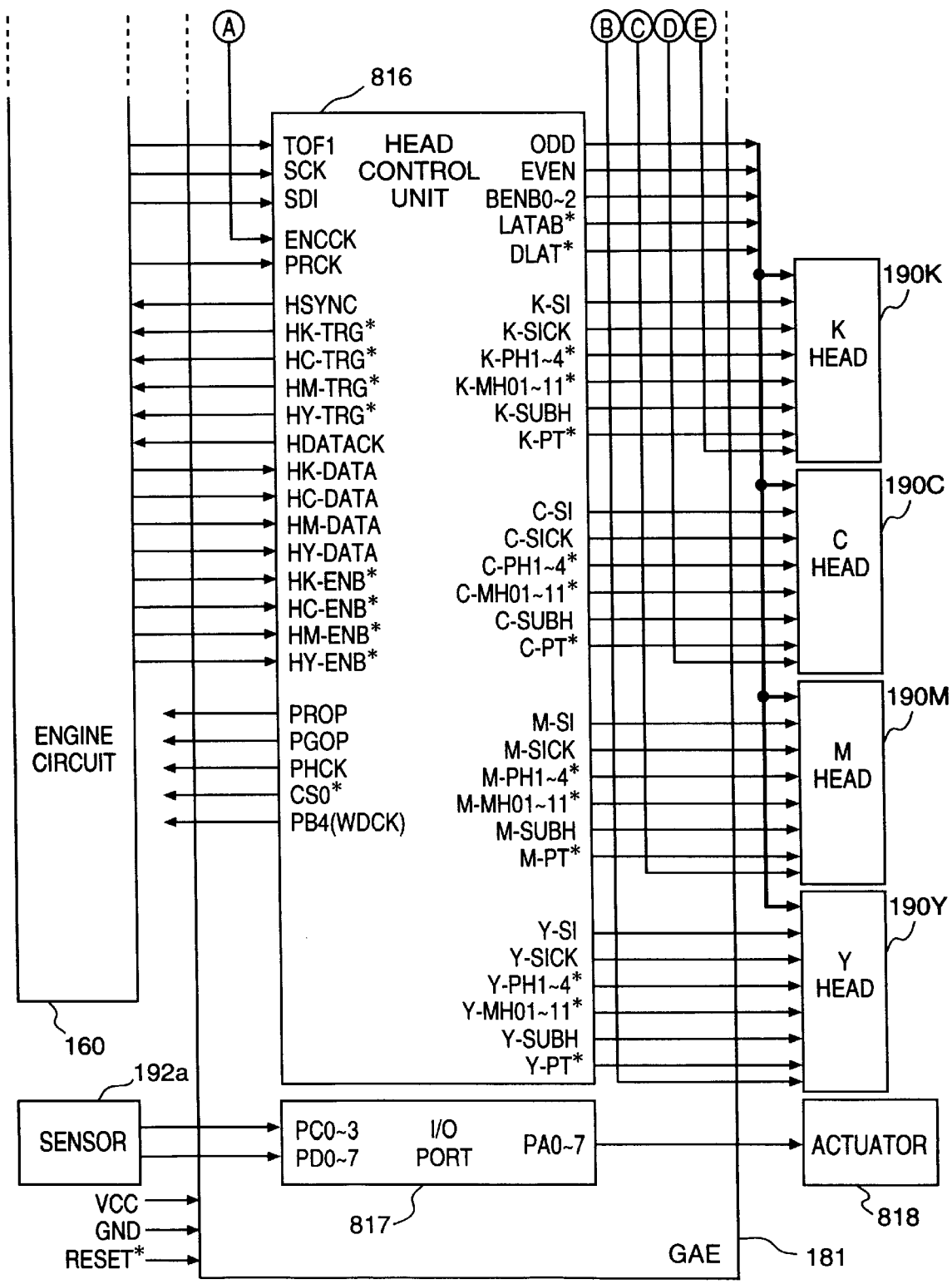

FIGS. 8A and 8B are block diagrams showing the arrangements of the gate array (GAE) 181 in the engine circuit 180.

The GAE 181 has a function of controlling the rotations of motors 191a to 191c required for the engine circuit 180, a function of controlling an encoder 192b which operates in synchronism with the movement of printing paper, the above printhead control function, a port control function, and the like. Reference numeral 810 denotes a system control circuit; 811, a decoder; 812 to 814, motor drivers for rotating/driving the corresponding motors; 191a, the head motor for vertically moving the printhead 190 to perform a recovery operation therefor; 191b, the capping motor for moving a cap to cap the printhead 190; and 191c, the lead motor. The encoder 192b is brought into contact with printing paper as a recording medium and generates a signal upon movement of the paper. The signal from the encoder 192b is input to an encoder control unit 815 to generate a signal ENCCK, which is output to a head control unit 816. Reference numeral 192a denotes a sensor unit, which includes sensors for detecting the position of the printhead in the vertical direction, the position of the cap, and the like. Input signals from these sensors are input through an I/O port 817 and output to an actuator 818. Reference numeral 816 denotes a head control unit for controlling data to be output to the printheads of the respective colors, performing driving control of the printheads, and the like. The operation of the head control unit 816 will be mainly described below.

Figure 9A:
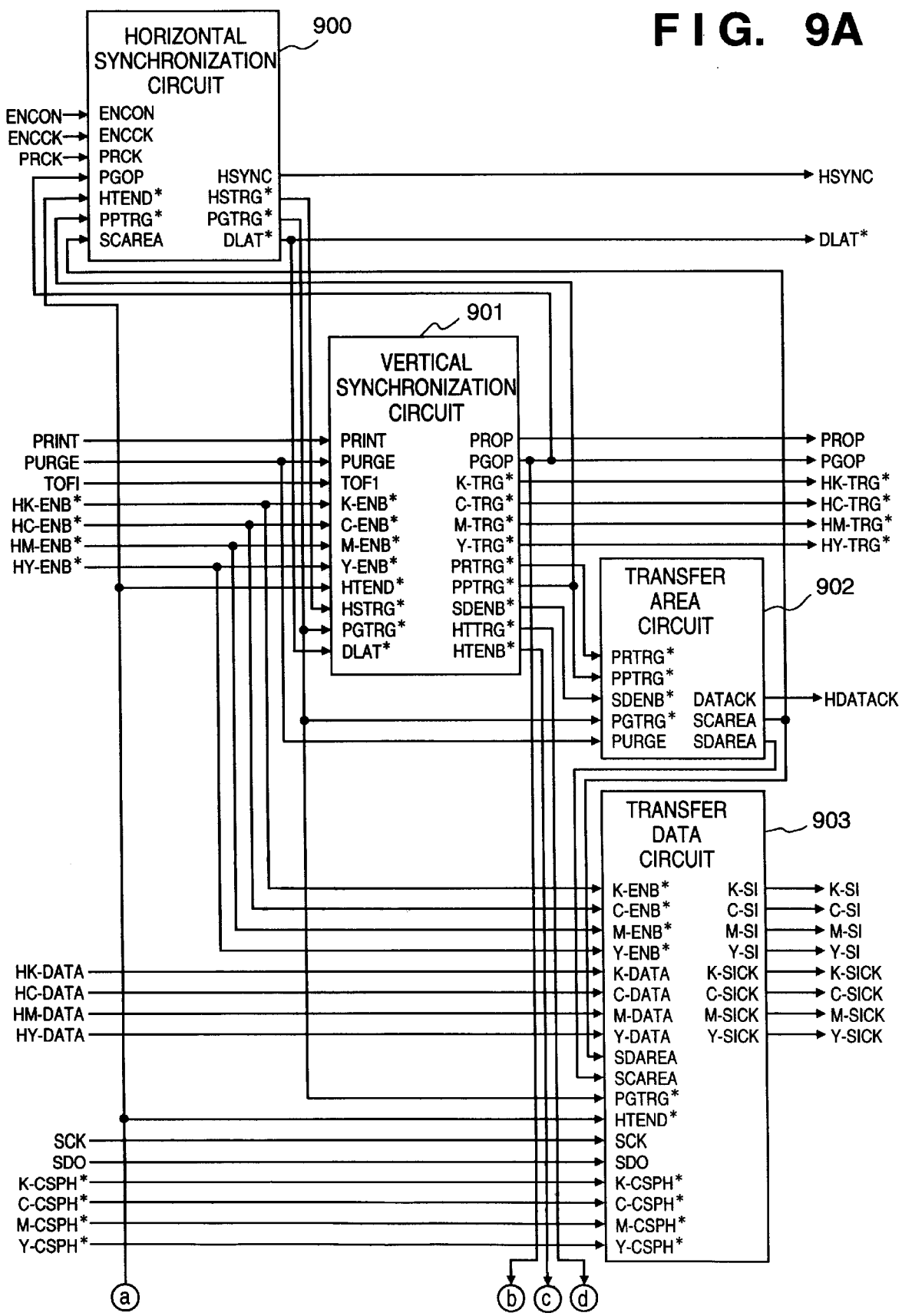
FIGS. 9A and 9B are block diagrams showing the arrangements of a head control unit 816 in the GAE 181.
Figure 9B:
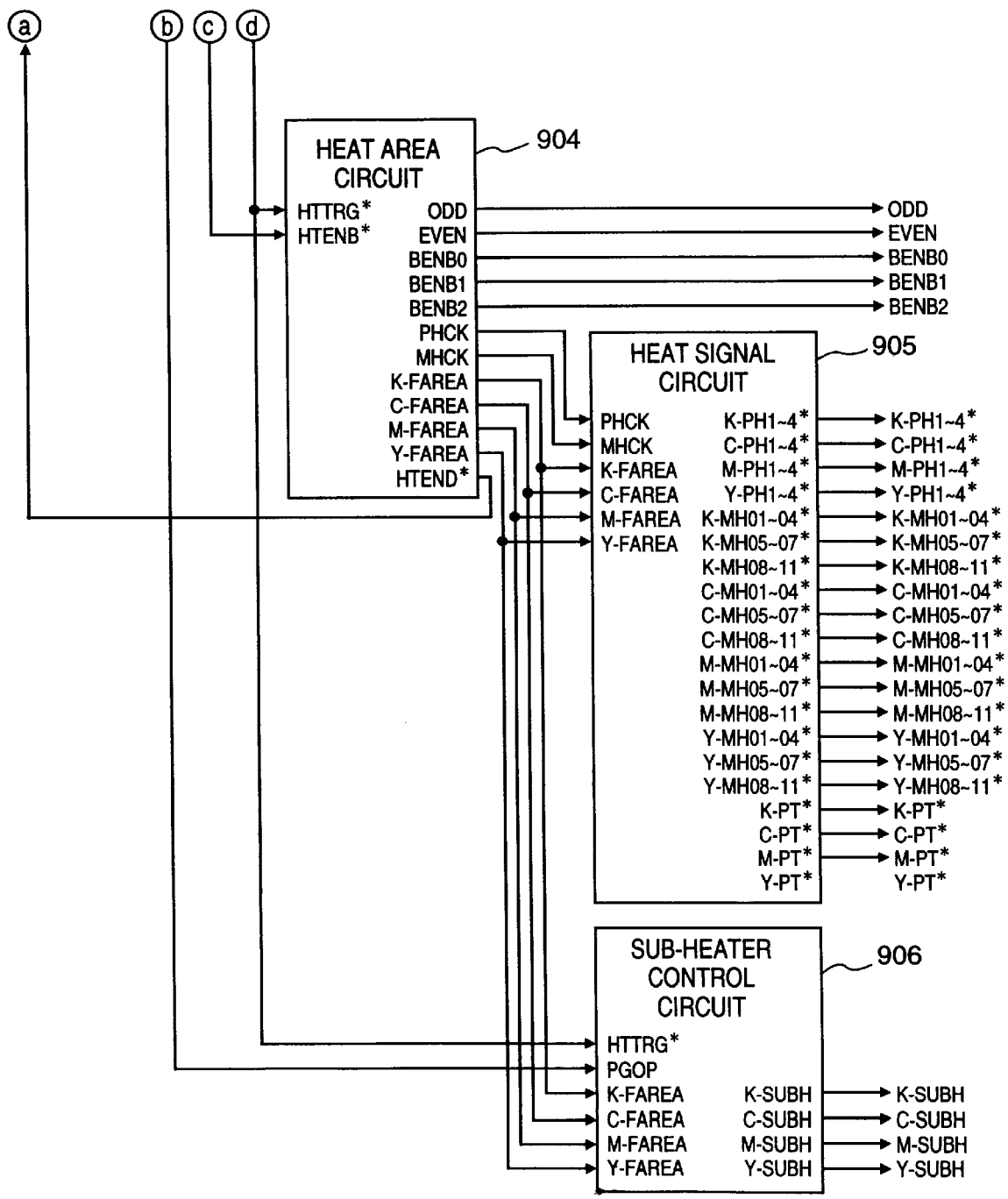

FIGS. 9A and 9B are circuit diagrams of the head control unit 816 in this embodiment. FIGS. 10A–10W comprise a timing chart showing a printing operation controlled by the head control unit 816.

The head control unit 816 includes a horizontal synchronization circuit 900, a vertical synchronization circuit 901, a transfer area circuit 902, a transfer data circuit 903, a heat area circuit 904, a heat signal circuit 905, and a sub-heater control circuit 906. The respective circuits will be sequentially described below.

(a) Horizontal Synchronization Circuit 900

The horizontal synchronization circuit 900 is a circuit for generating a signal HSYNC serving as a reference signal for the printer of this embodiment. This printer uses a stepping motor as the convey motor 172. For example, printing paper is conveyed by 70.5 μm (one-dot distance: 1/360 in.) per driving clock for the convey motor 172. The signal HSYNC signal is generated on the basis of a signal PRCK as this clock signal.

In some cases, the friction coefficient between printing paper and the convey belt 173 is small, and the rotation distance of the convey motor 172 does not coincide with the moving distance of the printing paper. For this reason, the printer incorporates the encoder 192b capable of directly detecting the moving amount of the printing paper so that the signal HSYNC can be generated on the basis of a clock output signal (ENCCK) output from the encoder control unit 815 in accordance with a signal from the encoder 192b.

The horizontal synchronization circuit 900 generates the above signal DLAT* on the basis of a signal HTEND* as a heat end signal for nozzle heaters. A signal HSTRG* is a trigger signal based on the signal HSYNC*. A signal PGTRG* is a trigger signal for a purge operation to be described later.

(b) Vertical Synchronization Circuit 901

The vertical synchronization circuit 901 generates print data request signals HK-TRG*, HC-TRG*, HM-TRG*, and HY-TRG* for the respective colors on the basis of the signal HSYNC. The signal HK-TRG* is output after lines (TKGAP in FIG. 10) corresponding to ((the distance from the TOF1 sensor 171a to the black head 190K)−1) are counted with the signal HSYNC with reference to a signal TOF1 detected when printing paper is conveyed. If, for example, the distance from the TOF1 sensor 171a to the black head 190K is 10 mm, a signal HK-TRG* is output after the signal HSYNCs corresponding to 141 clocks (10× 1,000/70.5−1) are counted. That is, the signal HK-TRG* signal is output at the timing of transferring print data for the black head 190K. The signal HC-TRG* is output after lines (KCGAP in FIG. 10) corresponding to ((the distance between the black head 190K and the cyan head 190C)−1) are counted with the signal HSYNC. Similarly, the signal HM-TRG is output after lines (CMGAP in FIG. 10) corresponding to ((the distance between the cyan head 190C and the magenta head 190M)−1) are counted with the signal HSYNC. The signal HY-TRG is output after lines (MYGAP in FIG. 10) corresponding to ((the distance between the magenta head 190M and the yellow head 190Y)−1) are counted with the signal HSYNC. With these operations, data can be transferred to the head of each color at the timing one line ahead of the position of the printhead.

The engine circuit 160 returns a signal HK-ENB* on the basis of the signal HK-TRG*. The signal HK-ENB* is used to count lines to be printed, and corresponds to the page length. While the signal HK-ENB* is active, the signal HK-TRG* is output in synchronism with the signal HSYNC* to transfer data in units of lines. The same operation is performed with respect to signals HC-ENG*, HM-ENB*, and HY-ENB*.

With this data transfer method, print data can be transferred from the formatter 110 to the engine 150 without incorporating any print buffer in the engine 150 so that a great reduction in the cost of the engine 150 can be attained.

The signal PRTRG* is the logical sum of a trigger signal output in synchronism with the signal HSYNC and the signal PGTRG*. This will be described later.

The vertical synchronization circuit 901 also generates a signal HTTRG* for starting to send an electricity to nozzle heaters.

(c) Vertical Registration Adjustment

As described above, in the color printer, the print dot positions for the respective colors must accurately coincide with each other. This is because dots of colors other than cyan, magenta, and yellow are printed while being superposed on dots of other colors. For example, a blue dot is printed by superposing cyan and magenta dots; a red dot, by superposing magenta and yellow dots; and a green dot, by superposing yellow and cyan dots. However, since the print dot size is as small as 70.5 µm, such a precision cannot be mechanically attained. For this reason, a registration adjustment function is required. In this printer, the CPU-E 161 sets the counter value for generating the above print data request signal in the GAE 181. Even if, therefore, the mechanical precision is low, the print dot positions can be accurately aligned by changing the counter value.

(d) Transfer Area Circuit 902

FIGS. 11A–11I comprise a timing chart showing a sequence of operations of the transfer area circuit 902 and the transfer data circuit 903 in this embodiment.

The transfer area circuit 902 generates a signal HDATACK as a data transfer clock signal for the engine circuit 160, a signal SCAREA for generating the output timing of the SICK signal for the printhead 190, and a signal SDAREA for generating an effective area timing for each color data.

As described above, the printhead 190 has nozzle areas which cannot be used for a print operation. For these areas, only the SICK signal must be transferred without transferring actual data with the SI signal (i.e., transferring "0" data instead). In addition, only one signal HDATACK is transferred to the engine circuit 160. For this reason, in order to perform horizontal registration adjustment in the GAE 181 for each color, the SICK signal corresponding to the total number of nozzles may be output after the SICK signal is delayed by a time corresponding to a registration adjustment area with respect to the signal SCAREA, and the signal HDATACK corresponding to the number of print dots may be output after the signal HDATACK is delayed by a time corresponding to (an area which cannot be used for a print operation (24 nozzles))+(a horizontal registration adjustment area (16 nozzles))=40 clocks with respect to the signal SCAREA.

(e) Horizontal Registration Adjustment

As described above, since an increase in mechanical position precision is limited, the print positions in the horizontal direction must also be electrically adjusted. This adjustment method can be realized by shifting the signal SCAREA for each color and adjusting the output timing of the SICK signal for each color. More specifically, the CPU-E 161 adjusts the value of the horizontal registration adjustment register of the GAE 181 between "0" and "15" to change the number of clocks between the signal HDATACK and the SICK signal, thereby changing the positions of print nozzles in the horizontal direction. Assume that the horizontal registration adjustment of the black (K) head is set to "8", and the horizontal registration adjustment of the cyan (C) head is set to "15". In this case, eight nozzles of the print nozzles of the black head 190K on the right side are set as unused nozzles for horizontal registration adjustment, and 15 nozzles of the print nozzles of the cyan head 190C on the right side are set as unused nozzles for horizontal registration adjustment. In this state, a print operation is performed.

(f) Heat Area Circuit 904

The heat area circuit 904 generates a signal PHCK serving as a reference signal for time-divisionally sending electricity to nozzle heaters, the time-division signals ODD, EVEN, BENB0, BENB1, and BENB2 from the signal PHCK, and signals K-FAREA, C-FAREA, M-FAREA, and Y-FAREA indicating the timings at which an electricity is time-divisionally sent to the nozzles of the respective colors.

(g) Heat Signal Circuit 905

The heat signal circuit 905 generates the signals PHEAT1* to PHEAT4* and the signals MH1* to MH11* required to perform a print operation based on double pulse control, and the signal PT* as a heat pulse for internal temperature adjustment for each color. Referring to FIG. 7, "a-PT*" is a general term corresponding to the printheads 190K, 190C, 190M, and 190Y of the inks of the respective colors. The signals PHEAT1* to PHEAT4* are used as control signals for applying pre-pulses during a normal print operation.

(h) Sub-heater Control Circuit 906

The printhead 190 includes sub-heaters for heating/controlling the head independently of the nozzle heaters. The sub-heater control circuit 906 controls the sub-heaters.

(i) Recovery Operation

The ink-jet printer requires an operation sequence called a recovery operation to prevent clogging of nozzles in the printhead. This operation is required to eliminate factors which make the ink discharge operation unstable. For example, an ink may coagulate in nozzles, or dust and the like may adhere to the orifices of nozzles. More specifically, the ink in the printhead is pressurized and circulated, or the ink is forcibly discharged from all the nozzles.

Such an operation is irrelevant to the normal operation of the printer and must be performed independently of the formatter 110. Therefore, the recovery operation must be performed by only the engine 150. The recovery operation is basically performed during a period other than that of a print operation. If, however, the print time is long or high-density print operations are consecutively performed, a recovery operation must be performed even during the print operation. For this reason, recovery sequences are based on two operation timings, i.e., an off-printing purge operation timing and an on-printing purge operation timing, each of which requires control (see FIG. 10).

(j) Off-printing Purge Operation

The recovery operation of the printhead is an operation of discharging an ink from all the nozzles. No reference will be made to other operations, e.g., forcibly circulating an ink and wiping the discharge surfaces of the nozzles. An off-printing purge operation sequence will be described with reference to FIG. 10.

(1) The CPU-E 161 sets "1" first in the PURGE register of the GAE 181, and then sets "0" therein.

(2) The GAE 181 sets a signal PGOP indicating the execution of a purge operation to "1", and causes the horizontal synchronization circuit 900 to output the signal PGTRG*.

(3) The vertical synchronization circuit 901 outputs the signal HTTRG* on the basis of the signal PGTRG*. At this time, the signal PRTRG* is not output because no print data is requested.

(4) The transfer data circuit 903 fixes the signal SI as the print data of each color to high level and transfers the SICK signal.

The detailed arrangement and operation of the transfer data circuit 903 will be described later.

(5) The heat area circuit 904 and the heat signal circuit 905 generate normal double pulses from the signal HTTRG* to discharge an ink from printheads. When this ink discharging operation is completed, the signal HTEND* becomes active.

(6) The horizontal synchronization circuit 900 makes the signal DLAT* active in accordance with the signal HTEND*. With this operation, all the data in the printhead are set to the ON ("1") state, and afterward ink is discharged from all of orifices in the printhead (hereinafter this ink discharge operation is referred to as "a full-dot discharging operation").

(7) The vertical synchronization circuit 901 counts the signal DLAT*, and the CPU-E 161 performs a full-dot discharging operation the number of times set in the NPG register of the GAE 181.

(8) When the operation is completed, the GAE 181 sets the signal PGOP to "0", and the CPU-E 161 reads this signal and detects the end of the purge operation.

With the above operations, the off-printing purge operation is performed.

(k) On-printing Purge Operation

As described above, the transfer timing of print data differs from the nozzle heat timing of the printhead for the print data by one line. If, therefore, the above off-printing purge operation is performed during a print operation, print data for one line is lost, and printing is performed on the printing paper with all inks throughout the one line. For this reason, in the on-printing purge operation, the data transfer request signal to the formatter 110 is disabled at the timing of one line before the execution of the purge operation, and the data transfer request signal is output at the timing at which the on-printing purge operation is ended. This operation can be realized by controlling the timing at which the CPU-E 161 sets "1" in the PURGE register of the GAE 181 in the following manner.

(1) The CPU-E 161 detects the timing of the execution of an on-printing purge operation through some means.

(2) The CPU-E 161 sets "1" in the PURGE register of the GAE 181.

(3) The vertical synchronization circuit 901 of the GAE 181 masks the signal PRTRG* as the print data request signal to inhibit its output.

(4) The CPU-E 161 sends a clock to the convey motor 172 to convey the printing paper by one dot.

(5) Although the GAE 181 generates the signal HSYNC, the signal PRTRG* is not output. For this reason, data transfer from the formatter 110 is not performed. Since the signal HTTRG* is output, data for the m-th line is printed.

(6) The CPU-E 161 sets "0" in the PURGE register of the GAE 181.

(7) The vertical synchronization circuit 901 of the GAE 181 cancels the masked state of the signal PRTRG* to output it afterward.

(8) The GAE 181 performs the same operation as the off-printing purge operation.

(9) When the off-printing purge operation is completed, the vertical synchronization circuit 901 of the GAE 181 outputs a signal PPTRG*.

(10) The transfer area circuit 902 and the transfer data circuit 903 of the GAE 181 transfer data for the (m+1)th line.

(11) After the signal SCAREA becomes inactive by the signal PPTRG*, the horizontal synchronization circuit 900 of the GAE 181 outputs the signal DLAT*.

(12) The normal print operation is resumed.

With the above operations, not only the on-printing purge operation is properly performed, but also a proper print operation is performed.

Description of Functions of GAE 165 in Engine Circuit 160

Figure 12A:
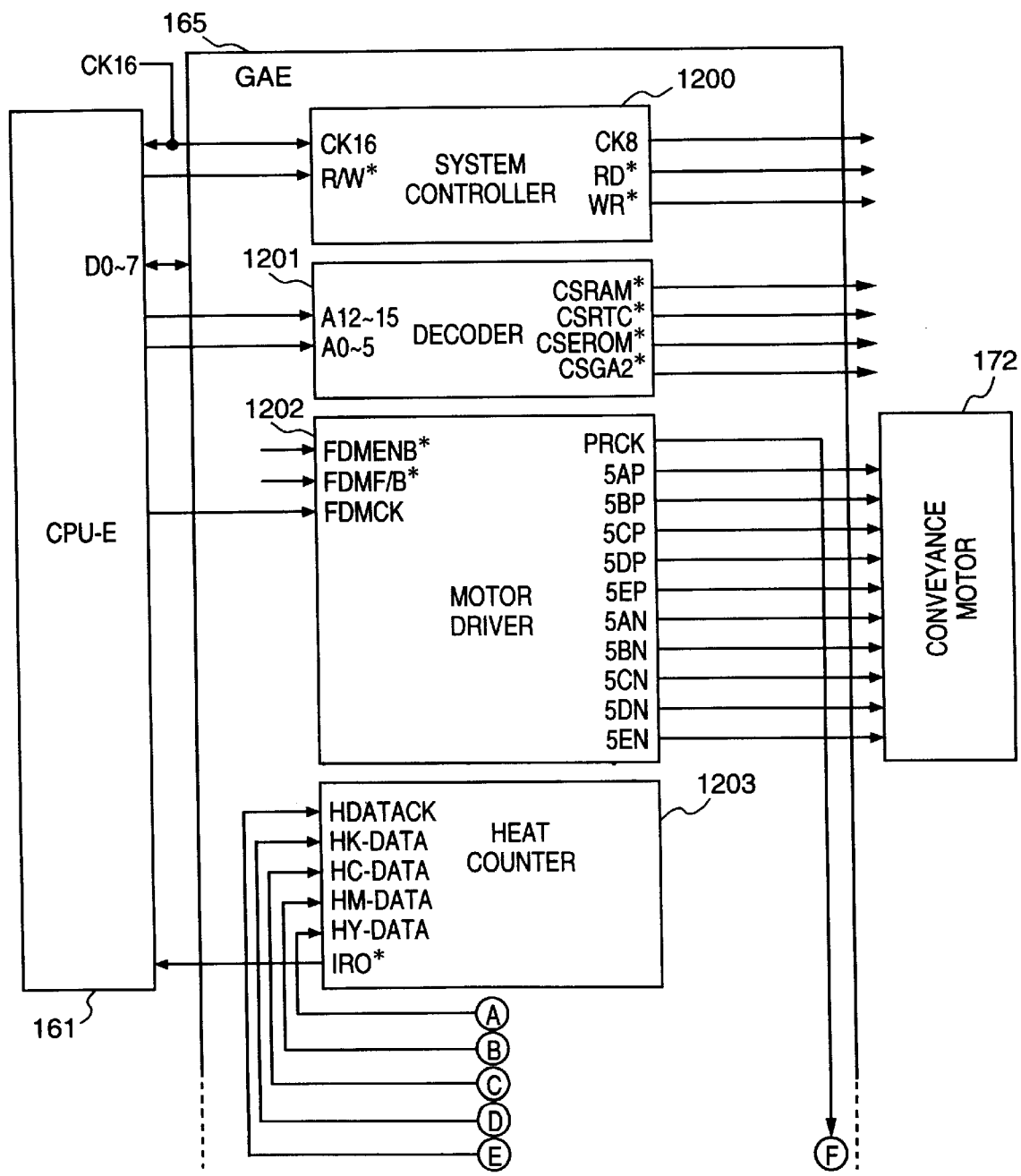
FIGS. 12A and 12B are block diagrams showing the arrangement of a GAE 165 of an engine circuit 160.
Figure 12B:
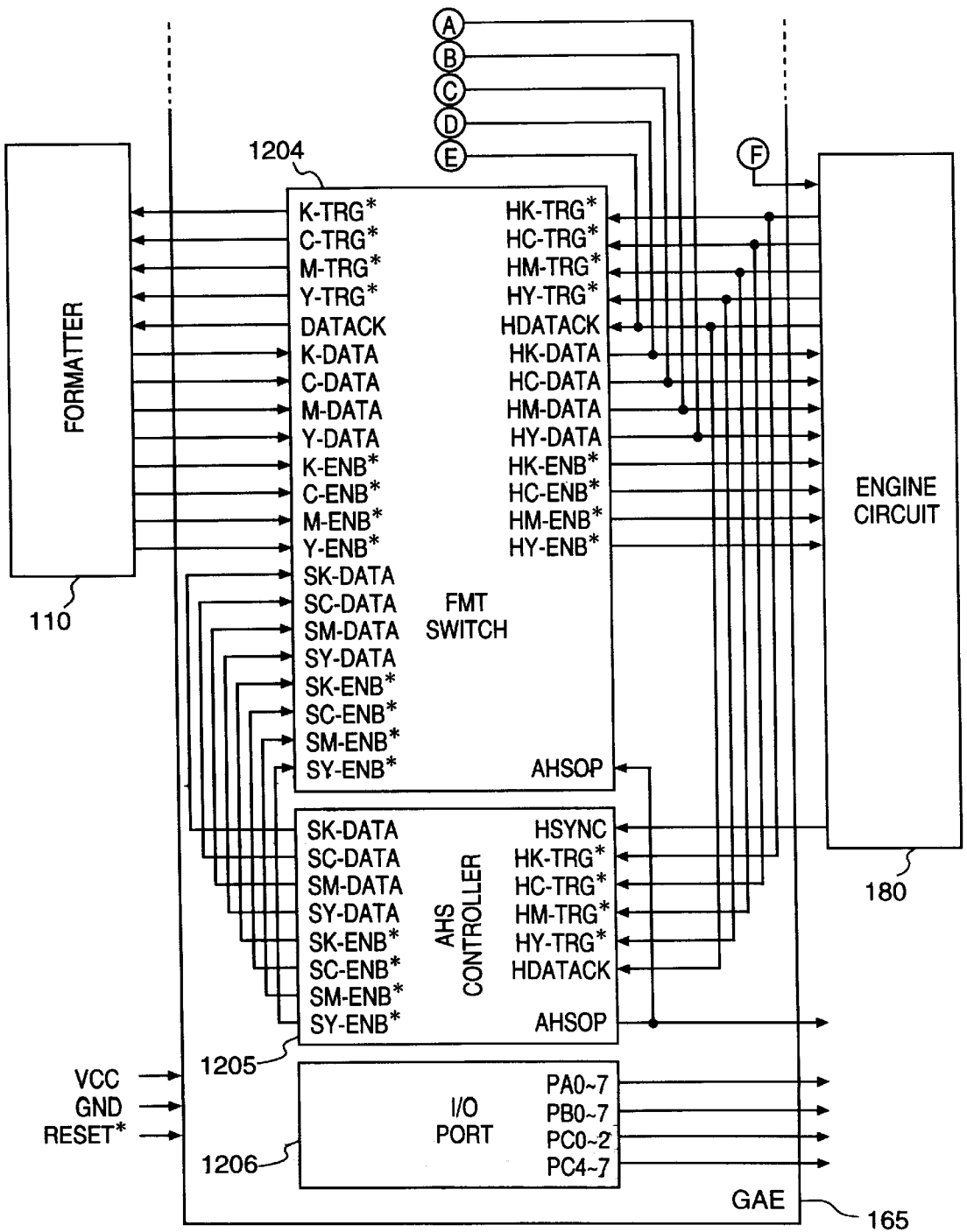

FIGS. 12A and 12B are block diagrams showing the internal arrangement of the GAE 165.

The functions of the GAE 165 include an AHS pattern creation control function (AHS controller 1205), a heat counter control function (heat counter 1203), a formatter switch control function (FMT switch circuit (FMTSW) 1204), a stepping motor control function (motor driver 1202), a port control function (I/O port 1206), and the like. The first three functions of the above functions will be mainly described.

(a) AHS (Auto Head Shading) Pattern Creation Control

As described above, in general, the printer is roughly constituted by two separate units, i.e., an engine 150 and a formatter 110. The printer needs to be designed such that when it is assembled or malfunctioned, the malfunctioned portion can be clearly identified. The engine 150 is therefore designed to perform some print operation by itself so as to allow the detection of a malfunction.

In the ink-jet printer, one of the most important factors which determine print quality is density unevenness, which must be easily measured. For this purpose, the GAE 165 incorporates a test pattern generation circuit for detection of density unevenness on a printed image, i.e., an AHS pattern creation circuit.

(b) Control of Heat Counter 1203

In the ink-jet printer, if an ink is continuously discharged for a long period of time, ink droplets adhere to ink discharge surfaces, resulting in an unstable discharging operation (to be referred to as a discharge failure). Measures for solving this problem include a method of counting the number of paper sheets printed and a method of evaluating the ink discharge amount by counting the print time. Neither of the methods can accurately calculate the ink discharge amount. In order to more accurately evaluate ink discharge amount, the printer includes the heat counter 1203 for counting the number of print data for discharging an ink for each printhead.

(c) Formatter Switch Control Circuit 1204 (FMT switch control)

As described above, in the printer which can be roughly separated into the formatter 110 and the engine 150, the engine 150 must be designed to perform a test print by itself. For this purpose, connection of signal lines must be changed depending on whether a normal print operation or a test print operation is performed. The FMT switch circuit 1204 is used to realize this function.

Figure 13:
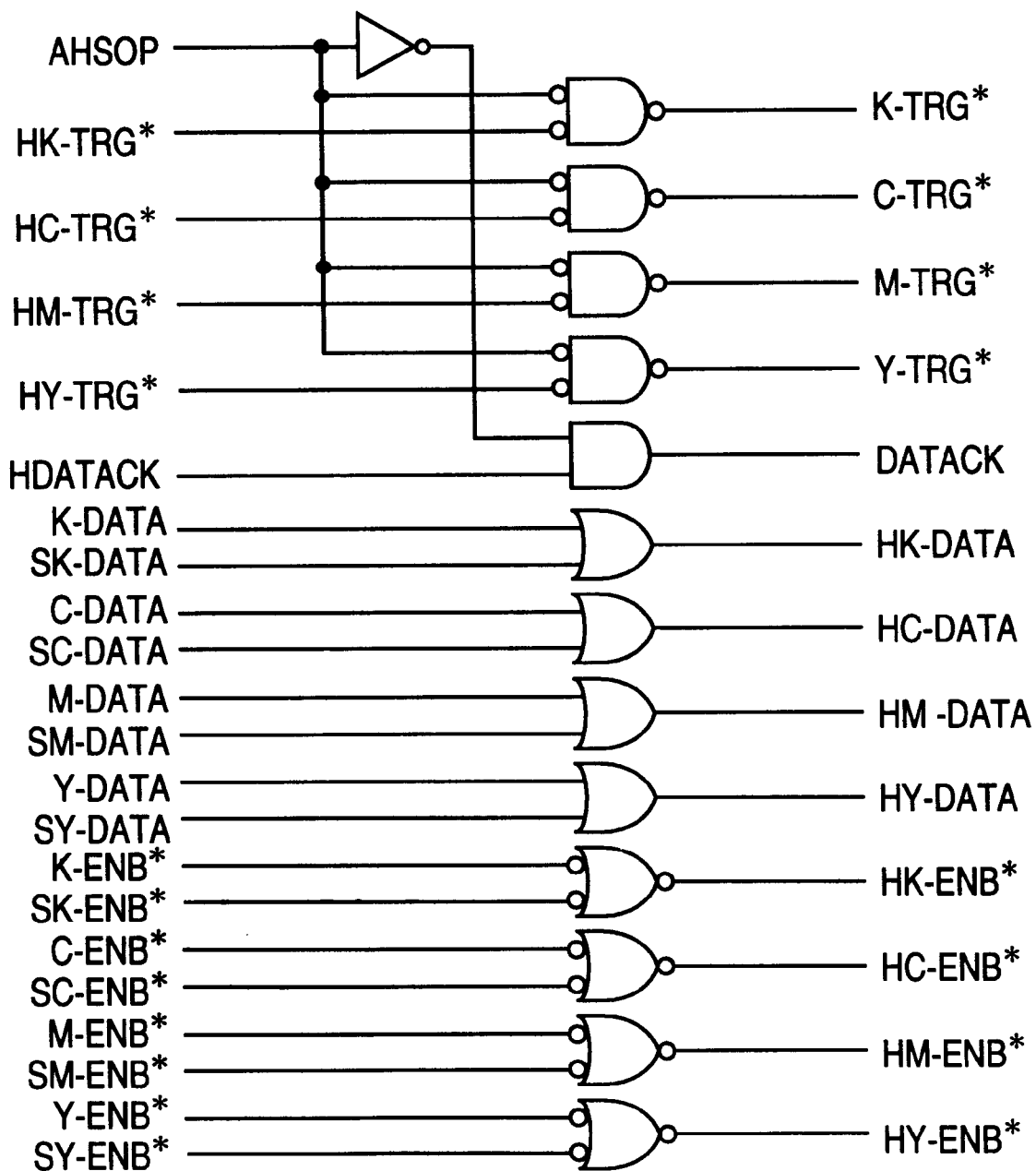
FIG. 13 is a circuit diagram showing the arrangement of an FMT switch circuit 1204 of the GAE 165.

FIG. 13 is a circuit diagram showing the arrangement of the FMT switch circuit 1204.

The FMT switch circuit 1204 inhibits signals K-TRG*, C-TRG*, M-TRG*, Y-TRG*, and DATACK to be transferred to the formatter 110 from being output when a signal AHSOP generated by an AHS vertical synchronization circuit is set at high level. In this way, a data transfer request to the formatter 110 during a test print operation is inhibited.

Signals HK-ENB*, HC-ENB*, HM-ENB*, HY-ENB*, HK-DATA, HC-DATA, HM-DATA, and HY-DATA which trigger data transfer to a GAE 181 are output upon calculating the logical sums between signals K-ENG*, C-ENB*, M-ENB*, Y-ENB*, K-DATA, C-DATA, M-DATA, and Y-DATA transferred from the formatter 110 and signals SK-ENB*, SC-ENB*, SM-ENB*, SY-ENB*, SK-DATA, SC-DATA, SM-DATA, and SY-DATA output as test print data.

The FMT switch circuit 1204 also electrically switches the print data transfer route in a normal print operation and a test print operation.

Description of Operation of Formatter 110

The main functions of the formatter 110 are to receive print data from the host computer, analyze the data, bitmap the data into a bitmap RAM 115, and communicate with the engine 150.

There are many technical references concerning reception, analysis, and bitmapping of print data from the host computer. That is, these techniques are well known techniques. A GAF 116 for controlling the bitmap RAM, which serves an interface unit for the engine 150, will be mainly described below.

Figure 14:
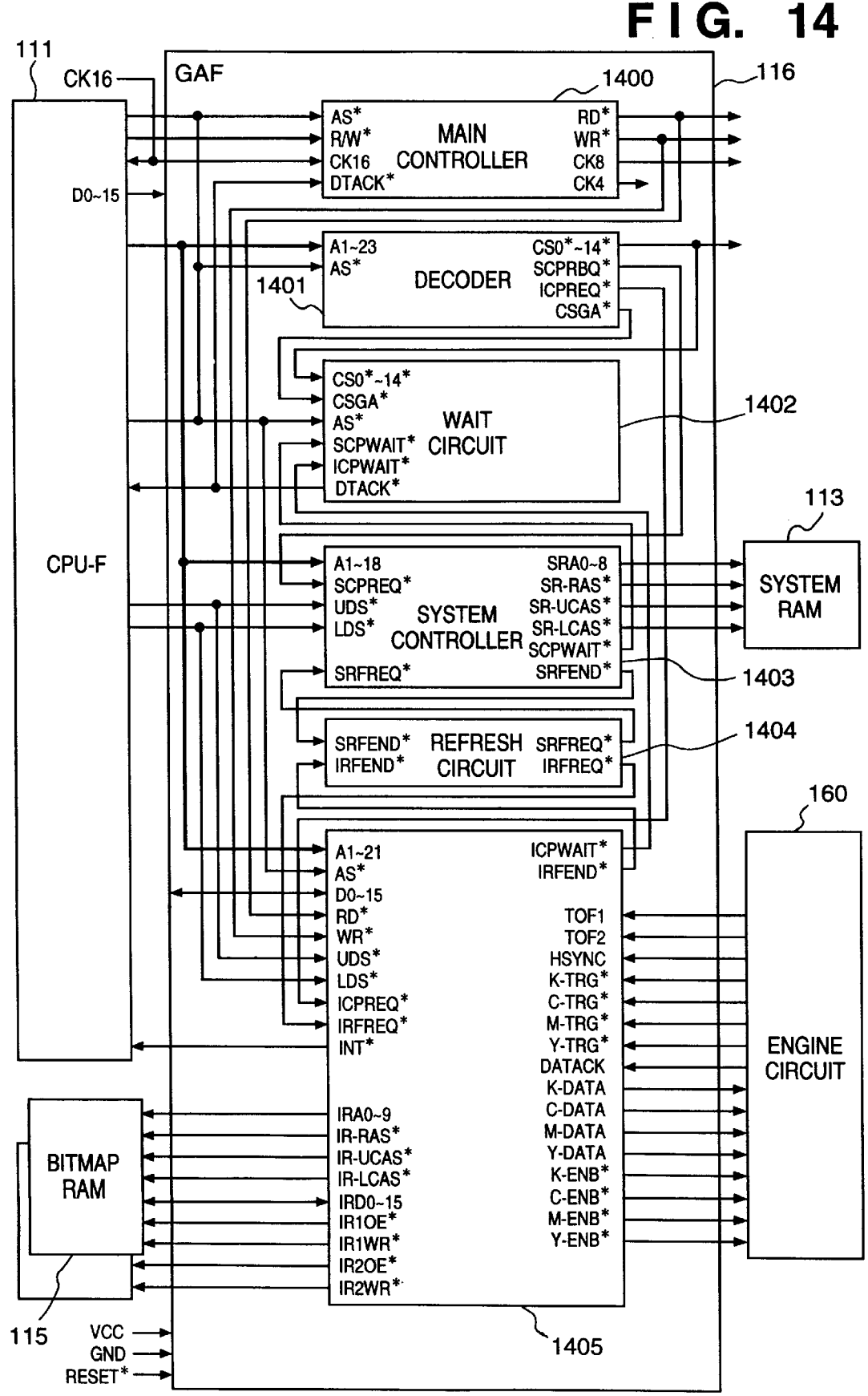
FIG. 14 is a block diagram showing the arrangement of a GAF 116 of a formatter 110.

FIG. 14 is a block diagram showing the internal arrangement of the GAF 116.

The main functions of the GAF 116 are a function of controlling a system RAM 113 (system controller 1403), a DRAM refresh control function (refresh circuit 1404), and an engine control function (engine control unit 1405). Of these functions, the control function for the engine control unit 1405, which is a characteristic feature of this embodiment, will be described below.

Figure 15:
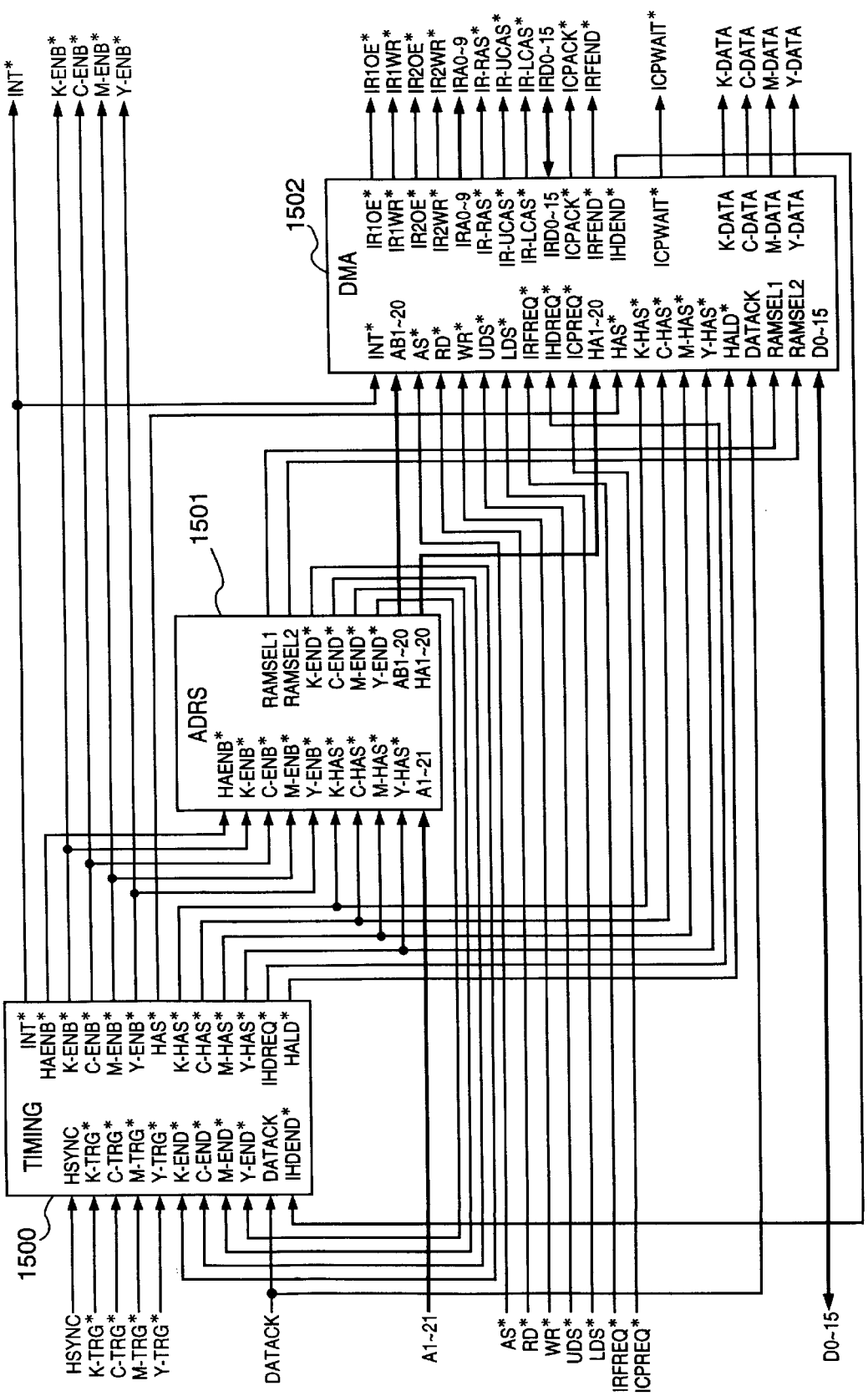
FIG. 15 is a block diagram showing the arrangement of an engine control unit 1405 of the GAF 116.

FIG. 15 is a block diagram showing the arrangement of the engine control unit 1405.

As shown in FIG. 15, the engine control unit 1405 is constituted by three circuit blocks. The first block is a timing (TIMING) block 1500 for producing a reference timing for data transfer. The second block is an ADRS block 1501 for generating an address for reading out data to be transferred to the engine 150 by read-accessing the bitmap RAM 115. The third block is a DMA block 1502 serving as an interface with the bitmap RAM 115.

The operation of the timing block 1500 will be described first.

Figure 16:
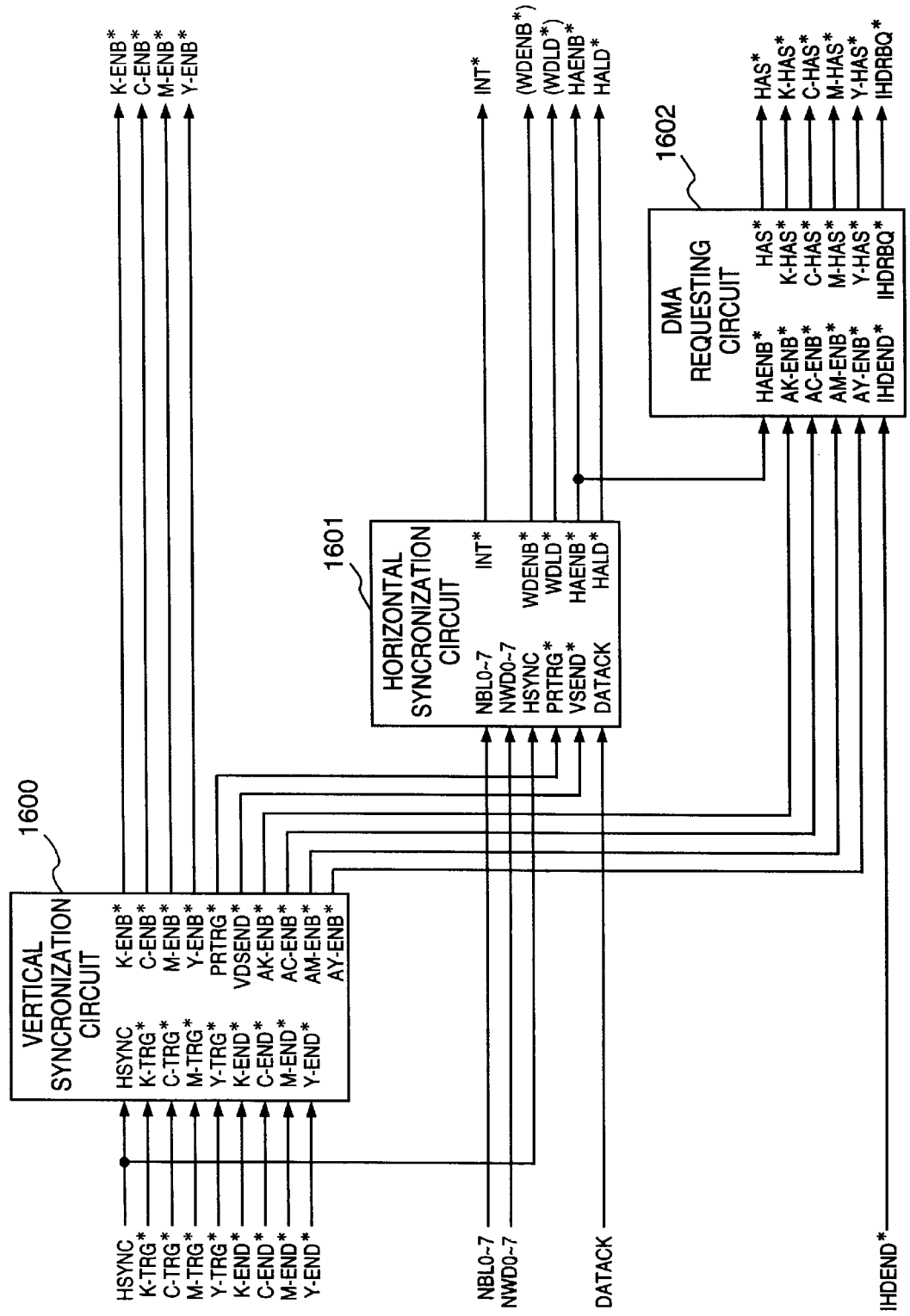
FIG. 16 is a block diagram showing the arrangement of a timing block 1500 of an engine control unit 1405.

FIG. 16 is a block diagram showing the arrangement of the timing block 1500. FIGS. 17A–17Z comprise a timing chart showing an operation sequence in the timing block 1500.

The timing block 1500 is constituted by a vertical synchronization circuit 1600, a horizontal synchronization circuit 1601, and a DMA requesting circuit 1602.

(1) Vertical Synchronization Circuit 1600

The vertical synchronization circuit 1600 generates signals a-ENB* and Aa-ENB* from a data transfer request signal a-TRG* sent from the engine circuit 160. The signal Aa-ENB* becomes active (low level) at the trailing edge of the signal a-TRG*, and becomes inactive in accordance with a signal a-END* output from the ADRS block 1501. The signal a-ENB* is inactivated (high level) in synchronism with a signal HSYNC after the signal Aa-ENB* becomes inactive. This is because the signal Aa-ENB* is a signal for requesting data for DMA and operates independently of horizontal synchronization, while the signal a-ENB* represents the print page length and requires horizontal synchronization.

(2) Horizontal Synchronization Circuit 1601

The horizontal synchronization circuit 1601 controls signals NBL and NWD for inputting "0" data to the right and left areas of the printhead which are not used for a print operation. More specifically, after the signal DATACK corresponding to the NBL register value is counted, the horizontal synchronization circuit 1601 makes a signal HAENB* as a DMA request signal for the bitmap RAM 115 active. The signal HAENB* is kept active only for a period corresponding to 16 clocks (16 bits) of the signal DATACK. This operation is repeated by the number of times corresponding to the NWD register value. At this time, the signal HALD* indicating that data of four colors is read out from the bitmap RAM 115 is also output.

Assume that the value of NBL is "0", i.e., a print operation is performed from the nozzle on the right end of the printhead. In this case, when the signal a-TRG* becomes active, data is read out from the bitmap RAM 115 regardless of the signal DATACK. In the engine 150, data is fetched at the leading edge of the signal DATACK, while data transfer is changed at the trailing edge of the signal DATACK. For this reason, when the first signal DATACK is input, it is necessary that the data of bit 0 ($b_0$) be output already.

(3) DMA Requesting Circuit 1602

The DMA requesting circuit 1602 calculates the logical product of the above-described signal Aa-ENB* and the signal HAENB*, and outputs a print data request signal a-HAS* for each color. Note that a signal IHDEND* is a signal indicating that one-word (16-bit) data is read. As described above, since the signal HAENB* is kept active only for a period of time corresponding to 16 clocks, the print data must be completely read within this period of time.

The address (ADRS) block 1501 will be described next.

The ADRS block 1501 is an address generation unit for DMA. The ADRS block 1501 sequentially outputs addresses for the four colors on the basis of the signal HAENB* from the timing block 1500. When DMA transfer for one page data is completed, the ADRS block 1501 outputs the signal a-END* to the timing block 1500.

The DMA block 1502 will be described next.

The DMA block 1502 is a circuit for realizing a bus-arbitration function of controlling access to the bitmap RAM 115, a DRAM control function, and a data transfer function of parallel/serial-converting data from the bitmap RAM 115, which is read by the DRAM control unit, and transferring the data in synchronism with the signal DATACK sent from the engine 150.

With the above operation, the print data is transferred to a printhead 190 to print a high-quality color image.

According to this embodiment described above, the following advantages can be obtained.

(1) In the color line printer constituted by the formatter and the engine as separate units, no buffer memory is needed in the engine, and print data can be directly transferred from the formatter to be printed.

(2) A print position registration function (registration adjustment function) required to realize a color print operation can be obtained.

(3) Even if a printhead recover operation is performed during a print operation, printing can be properly performed.

The above embodiment exemplifies an ink-jet printer. However, the present invention is not limited to this, and may be applied to a thermosensitive transfer printer using line heads and other color printers.

This embodiment exemplifies a color printer using printheads for four colors. However, the present invention can be equally applied to any printer having a plurality of line heads.

The constants in this embodiment, e.g., the number of nozzle heaters and the number of LSIs, are examples, and the present invention is not limited to them.

Second Embodiment

The second embodiment is associated with the nozzle portions, of each printhead of the printer of the first embodiment, which are not used for an actual print operation. As will be described below, control is performed to store no bitmap data corresponding to these portions in the bitmap memory, thereby effectively using the bitmap memory. The arrangement described in the first embodiment will not be described again, and only a characteristic feature of this embodiment will be described below.

A DMA block will be described.

Figure 18:
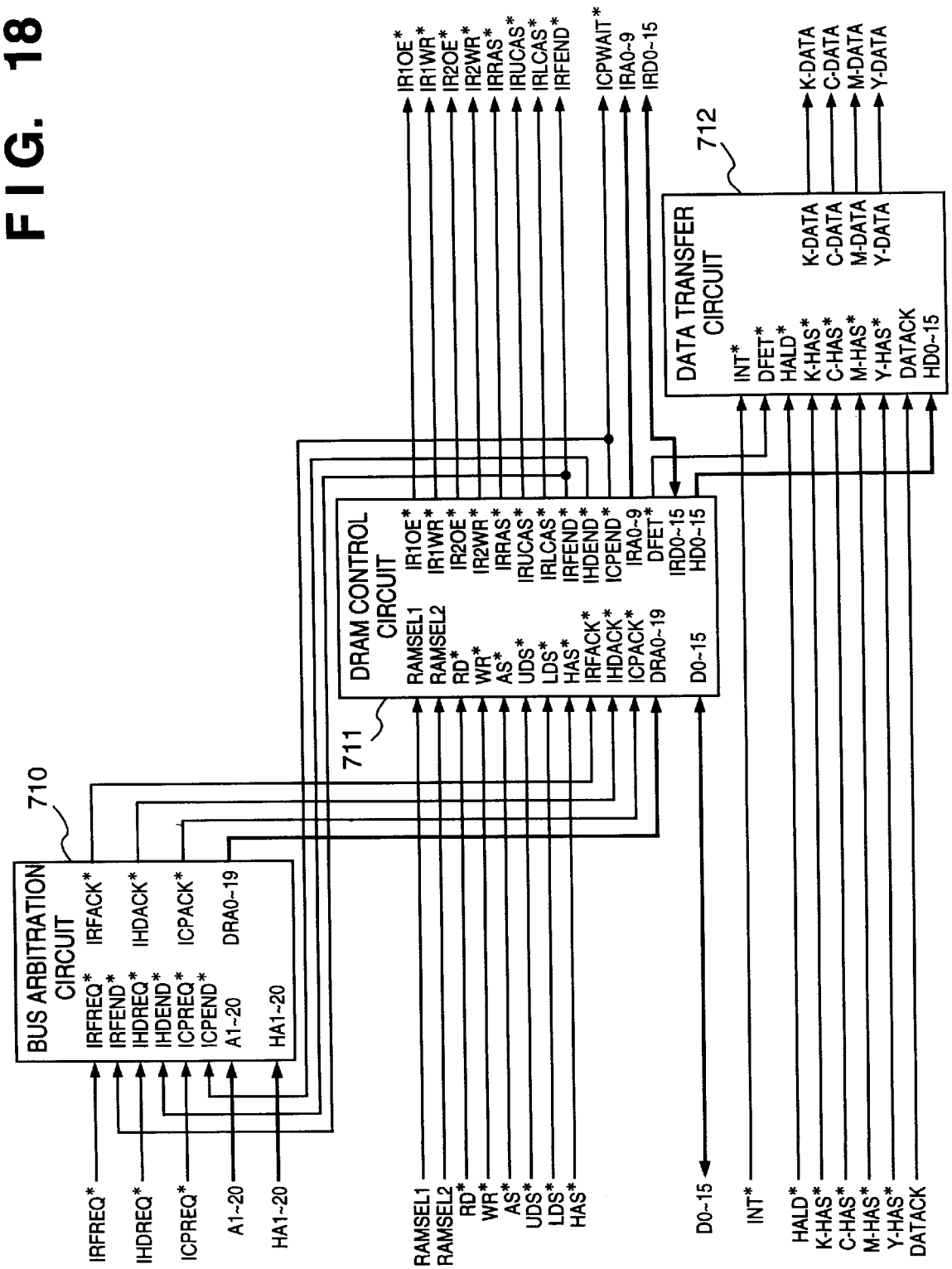
FIG. 18 is a block diagram showing the arrangement of a DMA block 1502 of an engine control unit 1405.

FIG. 18 is a block diagram showing the arrangement of a DMA block 1502.

As shown in FIG. 18, the DMA block 1502 is constituted by a bus arbitration circuit 710, a DRAM control circuit 711, and a data transfer circuit 712.

Bus Arbitration Circuit 710

Access to a bitmap RAM 115 includes three types of access operations, i.e., an access operation for a CPU-F 111 in a formatter 110 to read/write data, a read-access operation by a DMA operation, and an access operation for refreshing the bitmap RAM 115. These operations are independent of each other, and hence these three types of accesses to the bitmap RAM 115 may occur at a time. The bus arbitration circuit 710 therefore performs arbitration among these access operations to sequentially give access rights with respect to the bitmap RAM 115 to the respective units.

Data Transfer Circuit 712

Figure 19:
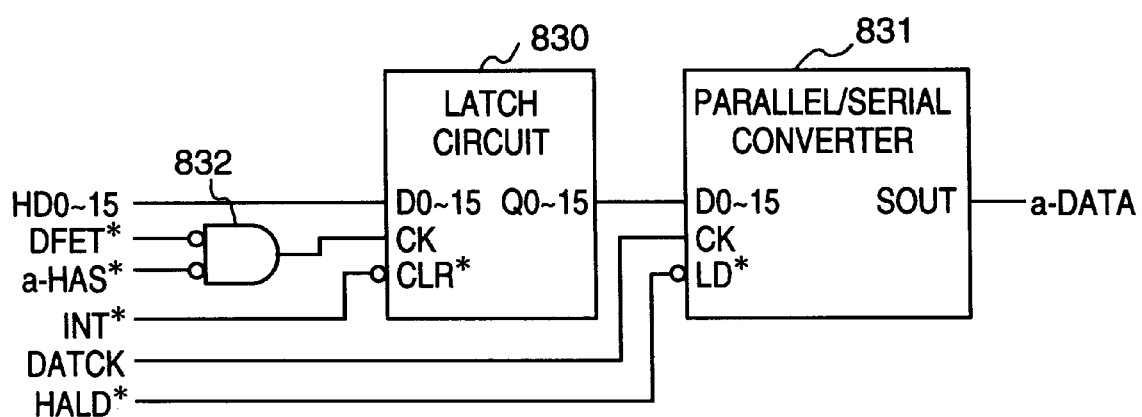
FIG. 19 is a circuit diagram showing the arrangement of a data transfer circuit 712 of the DMA block 1502.

FIG. 19 is a circuit showing the arrangement of the data transfer circuit 712. FIGS. 20A–20G comprise a timing chart showing an operation sequence in this circuit.

The data transfer circuit 712 clears a latch circuit 830, based on a signal INT* output in synchronism with a horizontal sync signal (HSYNC). A signal a-HAS* is a signal which is set at low level when 16-bit data of each color is read out and transferred from the bitmap RAM 115 by DMA. A signal DFET* is a latch signal for 16-bit data output from the DRAM control circuit 711.

Figure 17:
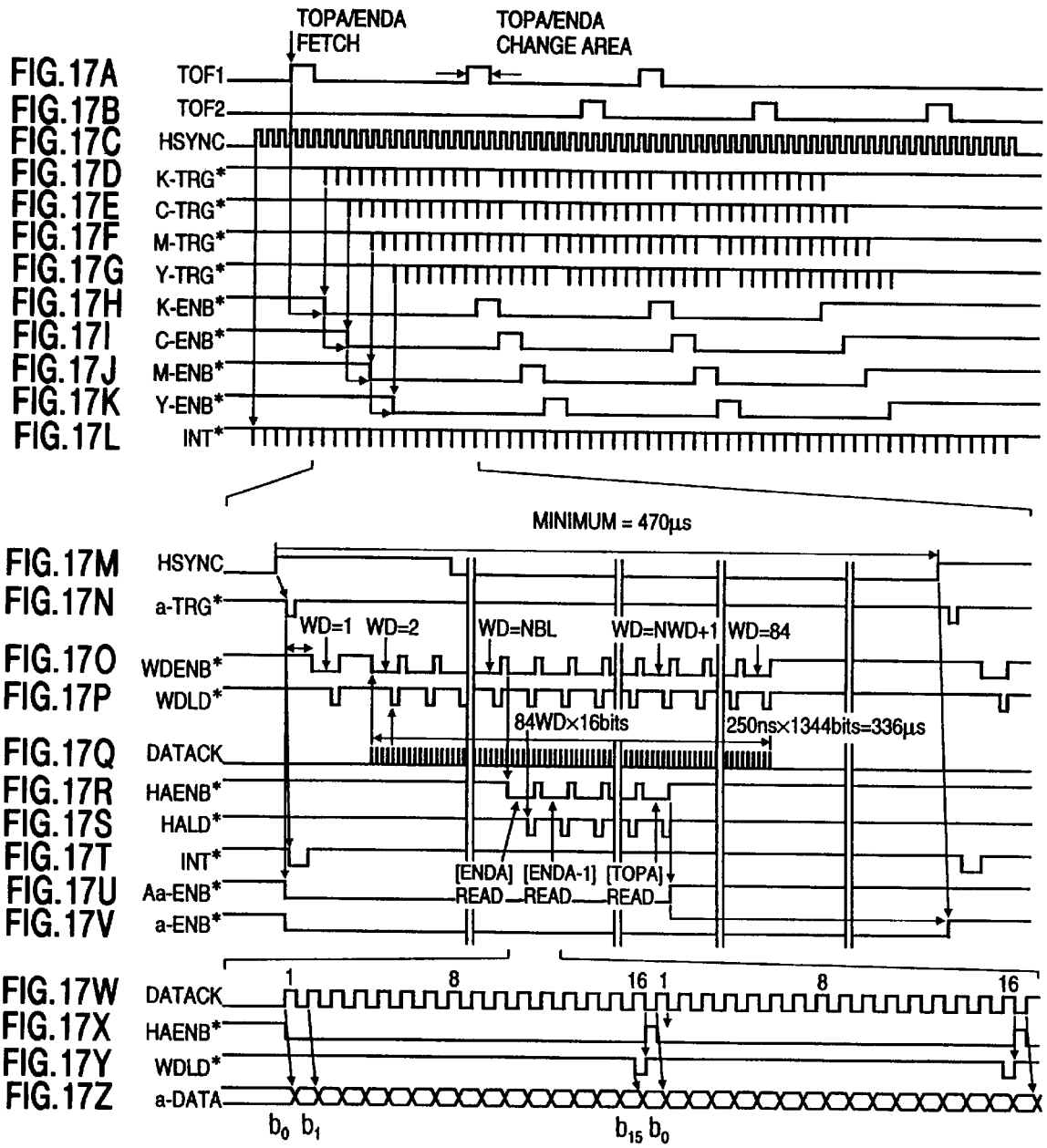
FIGS. 17A–17Z comprise a timing chart showing an operation sequence in the timing block 1500.

As described with reference to FIG. 17, the timing at which 16-bit data is transferred from the formatter 110 to an engine 150 is determined by a signal HALD* output after the value of NBL is counted. Before this signal HALD* is output, "0" is transferred as a signal a-DATA.

At the timing at which the signal HALD* is output and print data is transferred, the print data is output as signals HD0 to HD15, the output from a NOR gate 832 is set at high level in response to the signal DFET* for each color, and the signals HD0 to HD15 are stored in the latch circuit 830. When the print data for the four colors are stored in the latch circuit 830 (Note that the data transfer circuit 712 is arranged for each color) in this manner, the signal HALD* becomes active, and the 16-bit data is loaded into a parallel-serial converter 831. The data is then converted into serial data by the parallel-serial converter 831. The serial data is output as the signal a-DATA in synchronism with the signal DATACK transferred from the engine 150. With this operation, the print data is transferred to the engine 150.

When this transfer of the print data is completed, since no further load signal (HALD*) is input to the parallel-serial converter 831, the parallel-serial converter 831 outputs data "0". With this operation, "0" is output as the signal a-DATA.

The DMA block performs the above operation.

As described above, according to this embodiment, if there are nozzles, on the right and left portions of the printhead, which are not used for a print operation, the CPU-F 111 sets a right margin area and a nozzle area used for a print operation in the data transfer circuit 712. With this operation, the data transfer circuit 712 first sets "0" in a print data signal, and second counts reference clocks used for transferring data to the printhead by the margin area on the right side of the printhead. When this count operation is completed, print image data is transferred. When the number of reference clocks reaches the number of nozzles corresponding to the print area, the print image data is set to "0" again. By repeating this operation for every line, bit-map data corresponding to the portions which are not used for a print operation need not be stored in the bit-map memory.

As described above, according to this embodiment, in the printer using a line-type printhead, print image data, which is not used for an actual printing, corresponding to the nozzle areas on the right and left ends of the printhead need not be bit-mapped in the bit-map memory. This allows effective use of the bit-map memory, and hence the cost of the printer can be reduced, thereby providing an inexpensive printer.

This embodiment exemplifies a printer constituted by a formatter and an engine as separate units. However, the present invention can be applied to an integrated printer.

Although the engine can be separated into the two blocks, the same operation as that of the above engine can be performed even if the engine is constituted by one block.

This embodiment exemplifies a color printer using four line-type printers. However, a similar operation can be performed in any printer having two or more printheads.

The constants in this embodiment, e.g., the number of nozzle heaters and the number of LSIs, are examples, and the present invention is not limited to them.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, not only an exchangeable chip type printhead, as described in the above embodiment, which can be electrically connected to the apparatus main unit and can receive an ink from the apparatus main unit upon being mounted on the apparatus main unit but also a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices, or to an apparatus comprising a single device. Furthermore, it goes without saying that the invention is also applicable to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus which includes formatter means for receiving print data from an external unit and generating print image data, and print means for receiving the print image data from said formatter means and printing the data on a recording medium, and performs a print operation by using a line-type printhead, comprising:

request signal generation means for generating a request signal for requesting transmission of print image data for one line from said print means to said formatter means;

enable signal output means for outputting an enable signal for designating transfer of data for one page from said formatter means to said print means in response to the request signal generated by said request signal generation means;

transfer clock output means for outputting a clock signal, from said print means for requesting transfer of print image data to said formatter means in accordance with the enable signal outputted by said enable signal output means;

first transfer means for transferring the print image data from said formatter means to said print means in synchronism with the clock signal output from said transfer clock output means; and second transfer means for transferring the print image data transferred by said first transfer means to said printhead, wherein said print means includes said request signal generating means, said transfer clock output means and said second transfer means, and said formatter means includes said enable signal output means and said first transfer means.

2. The apparatus according to claim 1, wherein said print means has a sensor for outputting a detection signal upon detection of a recording medium, and said request signal generation means generates the request signal when a time corresponding to a distance between said sensor and said printhead elapses after the detection of the detection signal.

3. The apparatus according to claim 1, wherein said printhead has adjustment nozzles used for adjustment of a print position in a horizontal direction on both sides of nozzles used for printing, and
said transfer clock output means outputs a clock signal corresponding to nozzles other than unusable nozzles and the adjustment nozzles arranged on two end portions of said printhead.

4. The apparatus according to claim 1, wherein said printhead is a line head, for a color print operation, which includes head units for a plurality of colors.

5. The apparatus according to claim 4, wherein said printhead is an ink-jet head.

6. The apparatus according to claim 5, wherein said printhead is a printhead for discharging an ink by using heat energy, and includes a transducer for generating heat energy to be applied to the ink.

7. The apparatus according to claim 6, wherein said printhead causes a state change of the ink by using the heat energy applied from the transducer, and discharges the ink through an orifice on the basis of the state change.

8. The apparatus according to claim 5, further comprising determination means for determining whether or not to perform a head recovery operation during a print operation, and
wherein when said determination means determines that the head recovery operation is to be performed, said request signal generation means inhibits generation of the request signal until the head recover operation is completed, and outputs the request signal after the head recovery operation is completed.

9. A printing apparatus for receiving print data from an external unit and printing an image on a recording medium in units of lines by using a line-type printhead, comprising:
first storage means for bit-mapping the print data into a print image and storing the print image;
print means for receiving the print image and outputting the print image to said printhead, thereby printing the image on the recording medium;
second storage means for storing position information of a print element, of print elements of said printhead, which is not used for a print operation; and
transfer means for outputting print image data corresponding to a position of the print element which is not used for a print operation as non-print data based on the position information stored in said second storage means when the print image stored in said first storage means is transferred to said print means,
wherein the position information includes a number of print elements which are not used for a printing operation on at least one of right and left ends of said printhead, and a number of consecutive print elements used for the print operation.

10. The printer according to claim 9, wherein the position information includes the number of print elements which are not used for a printing operation on at least one of right and left ends of said printhead, and the number of consecutive print elements used for the print operation.

11. The apparatus according to claim 9, wherein said transfer means includes:
a DMA circuit for performing DMA transfer of print image from said first storage means to said print means; and
a timing control circuit for allowing said DMA circuit to perform data transfer after a line sync signal corresponding to the number of the print elements which are not used for the printing operation is input and counted.

12. The apparatus according to claim 10, wherein the line sync signal is a signal output in synchronism with conveyance of the recording medium by one line.

13. The apparatus according to claim 9, wherein said printhead is a line head, for a color print operation, which includes head units for a plurality of colors.

14. The apparatus according to claim 9, wherein said printhead is an ink-jet head.

15. The printer according to claim 9, wherein said printhead is a printhead for discharging an ink by using heat energy, and includes a transducer for generating heat energy to be applied to the ink.

16. A printing method for use with formatter means for receiving print data from an external unit and generating print image data, and print means for receiving the print image data from said formatter means and printing the data on a recording medium, and performs a print operation by using a line-type printhead, said method comprising the steps of:
generating a request signal for requesting transmission of print image data for one line from said print means to said formatter means;
outputting an enable signal for designating transfer of data for one page from said formatter means to said print means in response to the request signal generated in said request signal generation step;
outputting a clock signal, from said print means for requesting transfer of print image data to said formatter means in accordance with the enable signal outputted in said enable signal outputting step;
a first transfer step of transferring the print image data from said formatter means to said print means in synchronism with the clock signal output in said transfer clock outputting step; and
a second transfer step of transferring the print image data transferred in said first transfer step to said printhead,
wherein said print means performs said request signal generation step, said transfer clock outputting step and said second transfer step, and
said formatter means performs said enable signal outputting step and said first transfer step.

17. The method according to claim 16, wherein said print means has a sensor for outputting a detection signal upon detection of a recording medium, and
said request signal generation step generates the request signal when a time corresponding to a distance between said sensor and said printhead elapses after the detection of the detection signal.

18. The method according to claim 16, wherein said printhead has adjustment nozzles used for adjustment of a print position in a horizontal direction on both sides of nozzles used for printing, and
said transfer clock outputting step outputs a clock signal corresponding to nozzles other than unusable nozzles and the adjustment nozzles arranged on two end portions of said printhead.

19. The method according to claim 16, wherein said printhead is a color head, for a color print operation, which includes head units for a plurality of colors.

20. The method according to claim 19, wherein said printhead is an ink-jet head.

21. The method according to claim 20, wherein said printhead is a printhead for discharging an ink by using heat energy, and includes a transducer for generating heat energy applied to the ink.

22. The method according to claim 21, wherein said printhead causes a state change of the ink by using the heat energy applied from the transducer, and discharges the ink through an orifice based on the state change.

23. The method according to claim 20, further comprising the step of determining whether or not to perform a head recovery operation during a print operation, and wherein when said determining step determines to perform the head recovery operation, said request signal generation step inhibits generation of the request signal until the head recovery operation is completed, and outputs the request signal after the head recovery operation is completed.

24. A printing method for receiving print data from an external unit and printing an image on a recording medium in units of lines by using a line-type printhead, said method comprising the steps of:

bitmapping the print data into a print image and storing the print image in first storage means;

receiving, with print means, the print image and outputting the print image to said printhead, thereby printing the image on the recording medium;

storing, in second storage means, position information of a print element, of print elements of said printhead, which is not used for a print operation; and outputting print image data corresponding to a position of the print element which is not used for a print operation as non-print data based on the position information stored in said second storage means when the print image stored in said first storage means is transferred to said print means, wherein the position information includes a number of print elements which are not used for a printing operation on at least one of right and left ends of said printhead, and a number of consecutive print elements used for the print operation.

25. The method according to claim 24, wherein said print image data outputting step is performed by a DMA circuit for performing DMA transfers of the print image from said first storage means to said print means, and a timing control circuit for allowing said DMA circuit to perform data transfer after a line sync signal corresponding to a number of the print elements which are not used for the printing operation is input and counted.

26. The method according to claim 25, wherein the line sync signal is a signal output in synchronism with conveyance of the recording medium by one line.

27. The method according to claim 24, wherein said print head is a color head, for a color print operation, which includes head units for a plurality of colors.

28. The method according to claim 24, wherein said printhead is an ink-jet head.

29. The method according to claim 28, wherein said printhead is a printhead for discharging an ink by using heat energy, and includes a transducer for generating heat energy applied to the ink.

30. The method according to claim 29, wherein said printhead causes a state change of the ink by using the heat energy applied from the transducer, and discharges the ink through an orifice based on the state change.

31. A printing apparatus for performing printing on a printing medium by using a printhead in which a plurality of printing elements are arrayed, comprising:

formatter means for receiving print data from an external unit and generating print image data; and print means for receiving the print image data from said formatter means and performing printing by driving the plurality of printing elements of the printhead in accordance with the print image data, wherein when a request signal for requesting transmission of print image data is received, said formatter means outputs an enable signal for designating transfer of print image data for a predetermined area and outputs the print image data in accordance with an inputted clock signal, and said print means outputs the request signal to said formatter means, and outputs the clock signal to said formatter means when the enable signal outputted by said formatter means is received.

32. A printing means for performing printing on a printing medium by using a printhead in which a plurality of printing elements are arrayed, said method comprising:

a formatting step of receiving print data from an external unit and generating print image data with formatter means; and a print step of receiving the print image data generated in said formatting step and performing printing by driving the plurality of printing elements of the printhead in accordance with the print image data with print means, wherein when a request signal for requesting transmission of print image data is received, said formatter means outputs an enable signal for designating transfer of print image data for a predetermined area and outputs the print image data in accordance with an inputted clock signal, and said print means outputs the request signal to said formatter means, and outputs the clock signal to said formatter means when the enable signal outputted by said formatter means is received.

* * * * *

UNITED STATES PATENT AND TRADEMARK OFFICE
CERTIFICATE OF CORRECTION

PATENT NO. : 6,068,359
DATED : May 30, 2000
INVENTOR(S) : Inose et al.

It is certified that error appears in the above-identified patent and that said Letters Patent is hereby corrected as shown below:

Item [57] ABSTRACT,
Line 2, "bit-mapping" should read -- bitmapping --.
Line 22, "this" should read -- "0" --.

Column 12,
Line 30, "BENBO," should read -- BENB0, --.

Column 21,
Line 14, "line head," should read -- color head, --.
Line 30, "that" should read -- to perform --.
Line 31, "is to be performed" should be deleted.
Line 33, "recover" should read -- recovery --.
Line 39, "bit-mapping" should read -- bitmapping --.
Lines 58-62, Claim 10 should be deleted.
Line 63, "11." should read -- 10. --.
Line 65, "of print" should read -- of the print --.

Column 22,
Line 3, "the" (first occurrence) should read -- a --.
Line 5, "12." should read -- 11. --, and "claim 10," should read -- claim 11, --.
Line 8, "13." to -- 12. --.
Line 9, "line head," should read -- color head, --.
Line 11, "14." should read -- 13. --.
Line 13, "15." should read -- 14. --, "printer" should read --apparatus --, and "claim 9," should read -- claim 13, --.
After line 16, the following should be inserted:
-- 15. The printer according to claim 14, wherein said rinthead causes a state change of the ink by using the heat nergy applied from the transducer, and discharges the ink hrough an orifice based on the state change. --.

UNITED STATES PATENT AND TRADEMARK OFFICE
CERTIFICATE OF CORRECTION

PATENT NO.    : 6,068,359
DATED         : May 30, 2000
INVENTOR(S)   : Inose et al.

It is certified that error appears in the above-identified patent and that said Letters Patent is hereby corrected as shown below:

<u>Column 24,</u>
Line 31, "means" should read -- method --.

Signed and Sealed this

Twenty-third Day of October, 2001

Attest:

*Nicholas P. Godici*

NICHOLAS P. GODICI
*Attesting Officer*    *Acting Director of the United States Patent and Trademark Office*